US008799053B1

(12) United States Patent
Goldberg

(10) Patent No.: US 8,799,053 B1
(45) Date of Patent: Aug. 5, 2014

(54) SECURE CONSUMER DATA EXCHANGE METHOD, APPARATUS, AND SYSTEM THERFOR

(71) Applicant: Paul R. Goldberg, Palo Alto, CA (US)

(72) Inventor: Paul R. Goldberg, Palo Alto, CA (US)

(*) Notice: Subject to any disclaimer, the term of this patent is extended or adjusted under 35 U.S.C. 154(b) by 0 days.

(21) Appl. No.: 13/802,243

(22) Filed: Mar. 13, 2013

(51) Int. Cl.
*G06Q 10/00* (2012.01)
*G06F 21/62* (2013.01)
*G06Q 30/02* (2012.01)

(52) U.S. Cl.
CPC ........ *G06Q 30/0201* (2013.01); *G06F 21/6254* (2013.01)
USPC .......................................................... 705/7.29

(58) Field of Classification Search
CPC ..................................................... G06Q 10/00
USPC .......................................................... 705/7.29
See application file for complete search history.

(56) References Cited

U.S. PATENT DOCUMENTS

| 6,182,050 | B1 | 1/2001 | Ballard |
| 7,246,150 | B1 | 7/2007 | Donoho |
| 8,131,271 | B2 | 3/2012 | Ramer |
| 8,234,159 | B2 | 7/2012 | Heiser, II |
| 8,321,268 | B2 * | 11/2012 | Haas ............................ 705/14.1 |
| 2002/0091650 | A1 | 7/2002 | Ellis |
| 2005/0027871 | A1 * | 2/2005 | Bradley et al. ................ 709/227 |
| 2008/0015927 | A1 | 1/2008 | Ramirez |
| 2009/0055852 | A1 * | 2/2009 | Sardera ............................. 725/9 |
| 2009/0150238 | A1 | 6/2009 | Marsh |
| 2010/0293050 | A1 | 11/2010 | Maher |
| 2011/0010563 | A1 | 1/2011 | Lee |
| 2011/0016479 | A1 | 1/2011 | Tidwell |
| 2011/0022461 | A1 | 1/2011 | Simeonov |
| 2011/0173071 | A1 | 7/2011 | Meyer |
| 2012/0072284 | A1 | 3/2012 | Wang |
| 2012/0284746 | A1 | 11/2012 | Evans |
| 2012/0311035 | A1 | 12/2012 | Guha |
| 2013/0066724 | A1 | 3/2013 | Evans |

OTHER PUBLICATIONS

Mizrahi, Siemer Online Advertising Report Q3 2011, Dec. 23, 2011, pp. 12-21, 31, 34-38, Siemer & Associates, Los Angeles, California.
Rothman, Draft EU Privacy Regulation, Corporate Privacy Forum, Jan. 26, 2012, pp. 4-25, PAI Privacy Associates International LLC, Novi, Michigan.

(Continued)

*Primary Examiner* — Romain Jeanty

(57) ABSTRACT

A method, system, and apparatus for consumer authorized collection and communication of consumer data, while facilitating compliance with government consumer privacy legislation and regulations, is provided. Authorization is obtained from a user of a network connected appliance to collect and communicate to other entities consumer data resulting from the user's use of the appliance. The data is encrypted, linked with an appliance user anonymous identifier and communicated to a first entity, where it is analyzed by the use of defined parameters. Based on this analysis, the anonymous identifier of the appliance user is aggregated with anonymous identifiers linked with the consumer data of other appliance users whose consumer data has at least one parameter in common with the consumer data of the appliance user. The aggregate set of anonymous identifiers is provisioned to a second entity by the first entity. Subsequent interaction with the first entity provides the second entity with access to the appliance user of the appliance without revealing the identity of the appliance user or providing access to the appliance user's consumer's data.

20 Claims, 8 Drawing Sheets

(56) References Cited

OTHER PUBLICATIONS

Protecting Consumer Privacy in an Era of Rapid Change: Recommendations for Businesses and Policy Makers, FTC Report, Mar. 26, 2012, pp. 11-14, Federal Trade Commission, Washington, DC.

Consumer Data Privacy in a Networked World: A Frame Work for Protecting Privacy and Promoting Innovation in the Global Digital Economy, Feb. 23, 2012, pp. 47-52, The White House, Washington, DC.

* cited by examiner

SECURE CONSUMER DATA EXCHANGE METHOD, APPARATUS, AND SYSTEM THERFOR

BACKGROUND OF INVENTION

1. Field of Invention

This invention relates to the collection and provisioning of consumer data in compliance with government regulations, where the collection is performed without compromising consumer privacy and security, and the data is provided to entities that have an interest in using the data for delivering targeted advertisements and promotional campaigns to consumers.

2. Discussion of Related Art

Consumer data, that is data collected by a network connected appliance as a result of a consumer's use of the appliance, is being provided to a wide range of entities for the purpose of delivering targeted advertisements and promotional campaigns to consumers, along with news, multimedia entertainment content, and searched for information. Such collected data may include the consumer's product interests, preferences, network browsing history, physical location and personal data, and such entities may include publishers, advertisers, media agencies, Data Management Platforms (DMPs), Demand Side Platforms (DSPs) and Supply Side Platforms (SSPs). The appliance used for delivering such targeted advertisements is often the same appliance that is employed to collect the consumer's data. Since the collection of this data is carried out, in many cases, without the consumer's knowledge or consent, the entity collecting such data is often accused of compromising the consumer's privacy and security. Therefore, this practice has caught the attention of lawmakers around the world, especially in the 30 states of the European Economic Area, the United States, Australia and South Korea, and has led to legislation directed to controlling the collection, secure use, and storage of consumer data. Although there can be a high economic cost associated with violating these laws, due to an increasing number of strict regulations with harsh penalties being enacted, and there is significant consumer opposition to the unauthorized use and sharing of consumer data, a large number of organizations have chosen to work toward complying with the often conflicting government regulations, instead of discontinuing the practice of collecting consumer data. This course of action has, in many cases, been chosen because collected consumer data provides much of the business intelligence needed to achieve the organization's business objectives and advertising goals. These organizations are therefore working towards incorporating meaningful data security and privacy policies into their everyday operations.

However, due to the many entities currently participating in each online advertising transaction that employ and share appliance user consumer data, attempting to comply with government regulations is problematic. FIGS. 1 and 2 illustrate why this is so. FIG. 1 is a block diagram illustrating the entities participating in an example online advertising transaction, and FIG. 2 is a flowchart illustrating an example online advertising transaction between the entities depicted in FIG. 1. In the following discussion, all reference numbers between 100 and 199 designate elements of FIG. 1 and all reference numbers between 200 and 299 designate elements of FIG. 2. As can be seen from FIG. 1, participating entities can include: Advertiser 105, Media Agency 110, Demand Side Platform (DSP) 115, Data Management Platform (DMP) 120, Supply Side Platform (SSP) 125, Ad Exchange 130, Content Delivery Network 135, Publisher 140, Data Sources 150, and Network Connected Appliance 145. Consumer data collected by Network Connected Appliance 145 as a result of a consumer's use of the appliance, tracks many aspects of the appliance user's online behavior. This data is communicated over line 139 of FIG. 1 to Data Sources 150, where it is often augmented with additional specific real world appliance user data collected by the entities that comprise Data Sources 150. Such entities include data services that collect and amass offline (real world) consumer data, consumer demographics, and web analytics, in addition to data services that collect and amass online consumer data. Such data services can include credit card suppliers, financial institutions, credit scoring agencies, social networking sites, gaming sites, online e-tailers, brick and mortar department stores, energy companies, utilities and super markets, among many others. DMP 120 receives consumer data over line 127 from Data Sources 150, and provides raw and processed versions of the data to Advertiser 105, Media Agency 110, DSP 115, SSP 125, and Publisher 140. over lines 111, 113, 109, 123, and 153 respectively.

In Block 200 of FIG. 2, the Advertiser 105 of FIG. 1 initiates an online advertising campaign based on the advertiser's objectives using data obtained from DMP 120. In Block 202, Media agency 110 creates the advertising campaign in response to Advertiser 105's stated objectives, utilizing data from DMP 120. In Block 204 Supply Side Platform (SSP) 125 determines audience reach of publishers on their platform using data from Publisher 140 and DMP 120, and obtains ad space availability, along with the specifications of the ad space, from publishers. These specifications may include the size of the available ad space, the location of the ad space with respect to other web page elements, and the content being published in the space located adjacent to and surrounding the available ad space, among others. In the example of FIGS. 1 and 2 this information is communicated to DSP 115 through DMP 120. Going through DMP 120 provides the opportunity for DMP-120 to augment the information with processed data and data from Data Sources 150 before it is communicated to DSP 115. Such processed data may include an analysis of consumer data collected from appliance users who have previously visited the publisher's website, an analysis of the demographics of the audience usually served by the publisher, an analysis of the possible affect on the advertiser's brand by the content in close proximity to the location of the available ad space, and an analysis of how advertising content and content layout can be optimized for effectiveness in the available ad space. In Block 206 DSP 115 determines an appropriate advertising campaign publisher utilizing the ad campaign received from Media Agency 110, and data from DMP 120. In Block 208 Ad Exchange 130 manages negotiations between DSP 115 and SSP 125 for the buying of ad space from a publisher on the SSP. At the conclusion of negotiations, DSP 115 selects a publisher to publish the ad campaign. In the example of FIGS. 1 and 2 Publisher 140 is selected. DSP 115 then delivers the ad campaign to Ad Exchange 130, Ad Exchange 130 delivers the ad campaign to Content Delivery Network 135 and Publisher 140 delivers the available ad space to Content Delivery Network 135, as shown in Block 210. In Block 212 Content Delivery Network combines the ad campaign from Ad Exchange 130 with the ad space from Publisher 140 and delivers the result to Publisher 140. The combined ad campaign and ad space is then published by Publisher 140 to the Web in Block 214 and the appliance user views the web published ad campaign on Network Connected Appliance 145 in Block 216.

In the above example at least 5 different entities receive the consumer data collected by Network Connected Appliance 145. These entities include: DMP 120, Advertiser 105, DSP 115, SSP 125 and Publisher 140. In addition, the entities that comprise Data Sources 150, entities that collect and supply consumer data from both a consumer's use of their network connected appliance and from real world consumer activities, have access to the consumer data they collect. It is therefore clear that there exists a need for a secure consumer data collection and provisioning approach that allows organizations to obtain the consumer data derived business intelligence they require, while simultaneously facilitating simple, easy to implement, easy to maintain, and low cost compliance with evolving government legislation and regulations.

SUMMARY OF INVENTION

The present invention provides a method, system, and apparatus for authorized consumer data collection and access to the consumer from which the consumer data was collected. It performs these functions by obtaining authorization from a user of a network connected appliance to collect and provision to other entities consumer data resulting from the user's use of the appliance; collecting the consumer data; linking the collected consumer data with an appliance user anonymous identifier; communicating the consumer data and appliance user's anonymous identifier to a first entity; analyzing the data at the first entity by the use of one or more defined parameters; aggregating at the first entity the appliance user's anonymous identifier with a set of appliance user anonymous identifiers linked with consumer data of other appliance users, thereby generating an aggregate set of appliance user anonymous identifiers, wherein each appliance user anonymous identifier included in the aggregate set points to an appliance user whose collected consumer data corresponds to at least one defined parameter in common with the collected consumer data of the other appliance users whose anonymous identifiers are included in the aggregate set; communicating the aggregate set from the first entity to a second entity, such as an advertiser of goods or services, a publisher of news or commentary, or a creator of entertainment content; and providing the second entity with the ability to establish communications with the appliance user through the first entity by use of the appliance user's anonymous identifier. Such a second entity may, for example, be interested in seeking access to a large group of appliance users whose appliance use behavior indicates a possibly heightened interest in the second entity's offerings. Compliance with government consumer privacy legislation and regulations is facilitated because neither the consumer's identity nor the collected consumer data itself, is communicated to the second entity.

The network connected appliance for collecting and communicating to a first entity an appliance user's consumer data resulting from the user's use of the appliance can be comprised of a processor, a memory, a network communications interface and a computer program stored in the memory and executed on the processor. Such a computer program could, for example, be downloaded from the first entity in the form of a software application. When these elements are employed to implement the network connected appliance of the present invention, the processor obtains authorization from the appliance user to collect and communicate the appliance user's consumer data to the first entity; the processor generates an appliance user anonymous identifier; the processor collects appliance user's consumer data; the processor links the generated appliance user anonymous identifier with the collected consumer data; the processor encrypts the consumer data; and the network communications interface communicates the encrypted consumer data and appliance user anonymous identifier to the first entity. Prior to this communication, the processor can also perform in-appliance de-identification of the collected consumer data. De-identification removes personally identifiable information (PII) from the collected consumer data.

The network communications interface of the appliance of the present invention, can also be used to receive communications from the first entity. These communications can be used to communicate to the appliance user the names of second entities to which an aggregate set of appliance user anonymous identifiers that includes the appliance user's anonymous identifier have been provided. In addition, these communications can include product, service or other offer descriptions available from such second entities. Such a communication could be in the form of a list of second entities with offer descriptions that include the website address where the offer is available. This allows the appliance user to click on, or touch, a list item and be connected to a website where the appliance user can obtain further information on the offer and, if desired, purchase the offered product or service. The list may also include second entity promotional material provided by the second entity, or on behalf of the second entity, to the first entity, in order to motivate the appliance user to visit the offer website. The list can be displayed to the appliance user in various forms with various structures. For example, the list may be presented as a sequence of items comprised of a series of text and/or graphic offer descriptions, sorted in alphabetical order. The list may be further structured such that the list items are sorted into categories that group related product and service offers together. The offer list could also be presented as icons, optionally with text labels, that are placed on the network connected appliance's display screen. In this case, the appliance user clicking on, touching, or hovering the Graphical User Interface's (GUI) pointer over an icon could cause a text and/or graphic description of the offer to be presented to the appliance user. To inform the appliance user of the availability of new offer descriptions, an icon could, for example, blink, change color, change shape, change orientation or change appearance in some other manner. An audio cue could also be used for this purpose.

Since the appliance user identifier provided to the second entity is anonymous it cannot be employed to contact the appliance user. However, it can be used to validate the appliance user as a qualified potential buyer of the second entity's offerings. This validation can occur when the appliance user initiates a communication with an offer website by clicking on an offer description. At the time of this event, the network communication interface of the appliance of the present invention can communicate a message to the first entity indicating that the appliance user has initiated communication with an offer website of the second entity. In turn, the first entity can communicate a message to the second entity that includes the appliance user's anonymous identifier and the offer's website address. This allows the second entity to compare the appliance user's anonymous identifier with the identifiers comprising the aggregate set of anonymous identifiers previously provided and confirm that an appliance user who has initiated a communication with one of their offer websites is a member of the aggregate set. This validates the authenticity of the appliance user as a qualified potential buyer of the second entity's offerings, and confirms that products and services of particular interest to the appliance user can be offered to the appliance user, possibly at a discount. The second entity then grants the appliance user's network connected appliance access to the offer website by communicating the appliance user's anonymous identifier to the operator of the offer website, who compares the anonymous identifier received from the second entity with the anonymous identifier received from the appliance user's network connected appliance. If there is a match, access is granted. For added consumer privacy and security, the appliance user can access the offer website through a proxy server, thereby providing the appliance user with greater anonymity. Such a proxy server can be operated by the first entity. Thus, the present invention provides second entities access to a large set of appliance users who meet defined criteria, without providing the second entity with the appliance user's consumer data, or violating the appliance user's privacy. Further, since the second entity did not collect, nor does it have access to, the collected consumer data used to generate the aggregate set of appliance user anonymous identifiers in its possession, it does not hold, or have access to, the appliance user's consumer data. Thus, the second entity can more easily comply with government consumer data collection, privacy, security, and use legislation and regulations.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE PREFERRED EMBODIMENT

Figure 1:
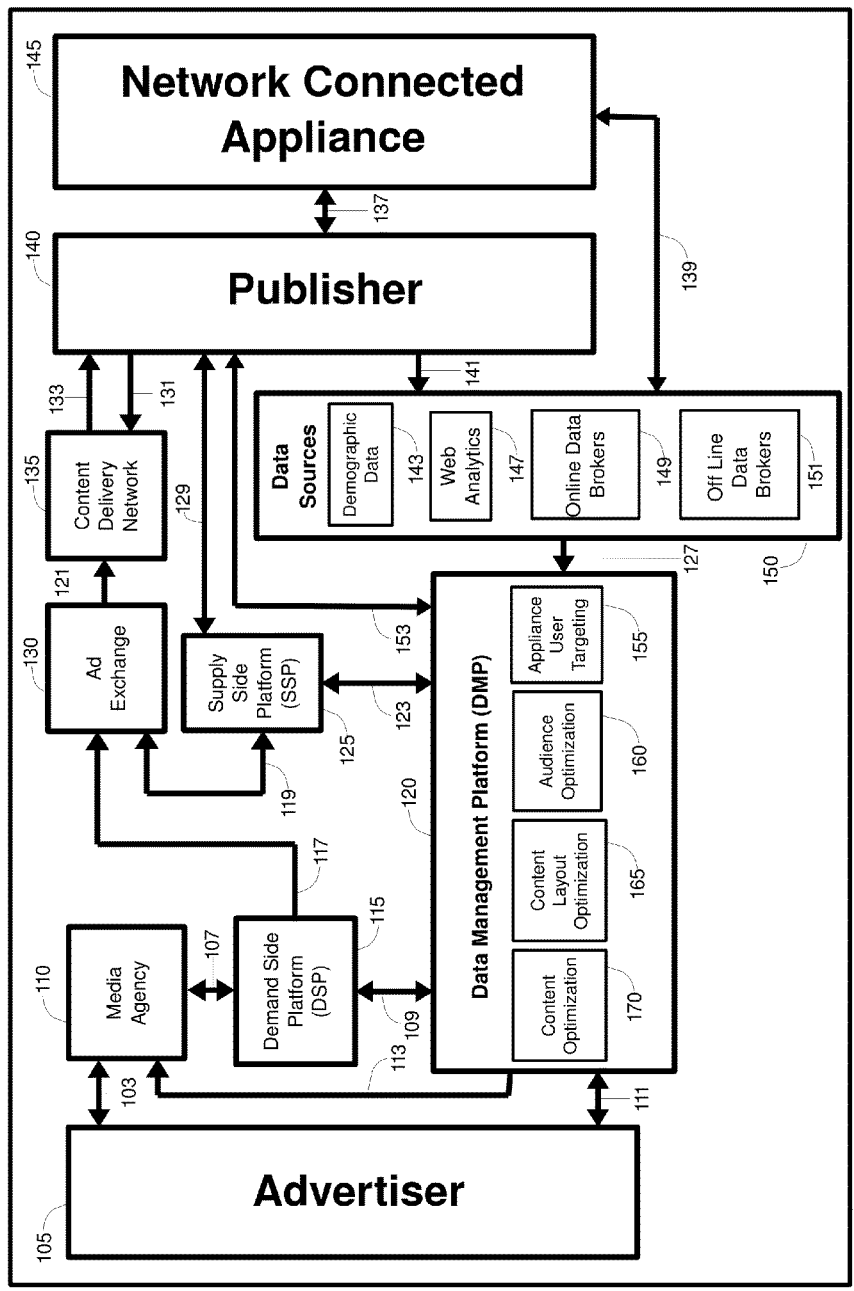
FIG. 1 is an example online advertising transaction participant block diagram [Prior Art]
Figure 2:
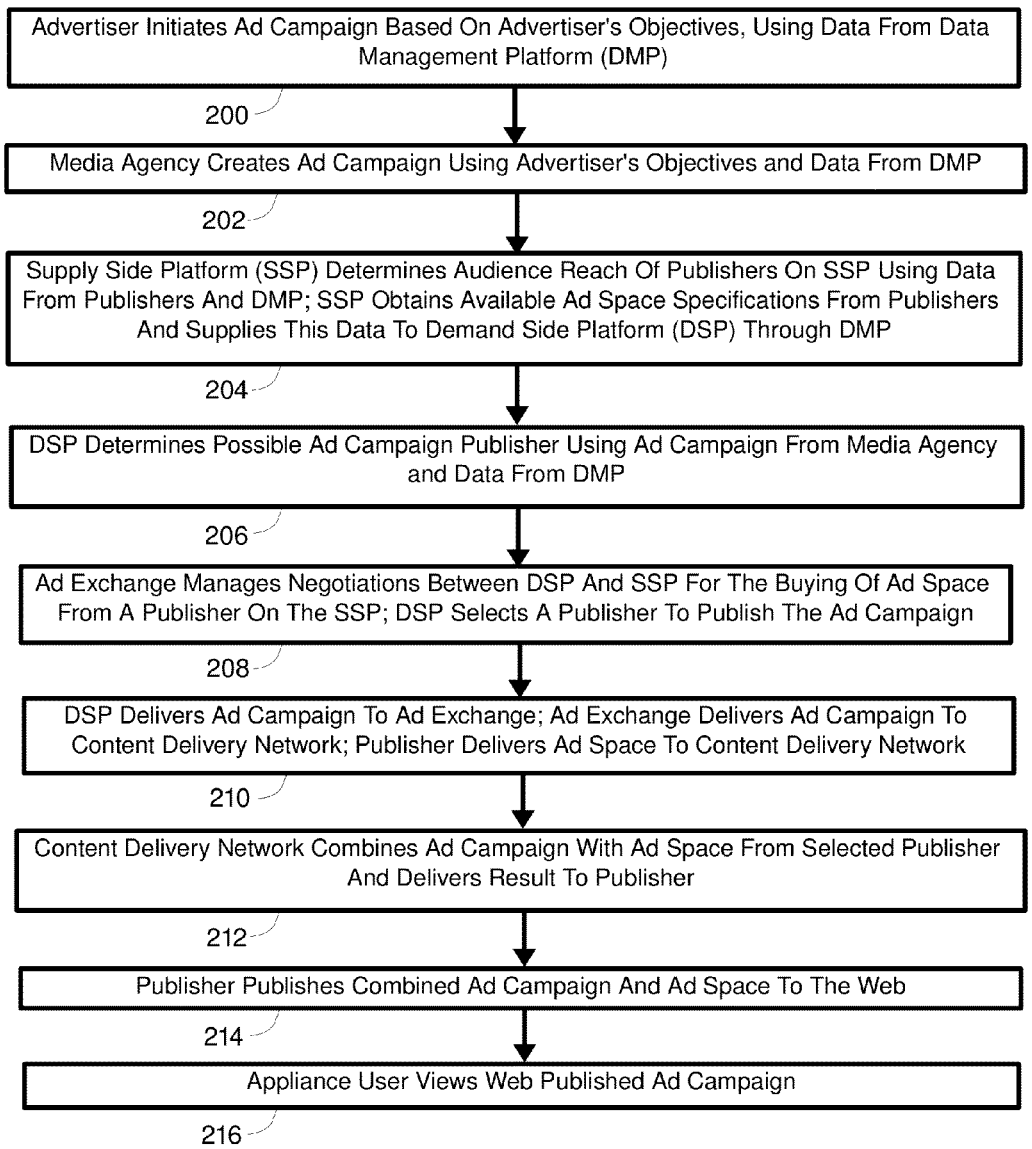
FIG. 2 is an example online advertising transaction flowchart [Prior Art]

The present invention will now be described more fully hereinafter with reference to the accompanying drawings, which form a part thereof, and which show, by way of illustration, a specific embodiment by which the invention may be practiced. The invention may, however, be embodied in many different forms and should not be construed as limited to the embodiment set forth herein; rather, this embodiment is provided so that this disclosure will be thorough and complete, and will fully convey the scope of the invention to those skilled in the art. Among other things, the present invention may be embodied as methods or devices. Accordingly, the present invention may take the form of an entirely hardware embodiment, and entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or", unless the context clearly dictates otherwise. The term "based on" is not exclusive and allows for being based on additional factors not described, unless the context clearly dictates otherwise. In addition, throughout the specification, the meaning of "a", "an", "and" and "the" include plural references. The meaning of "in" includes "in" and "on". Also, the use of "including", "comprising", "having", "containing", "involving", and variations thereof herein, is meant to encompass the items listed thereafter and equivalents thereof as well as additional items.

The present invention provides authorized consumer data collection and access to the consumer from which the consumer data was collected, without communicating the consumer's identity, or the collected consumer data itself, thereby facilitating compliance with government consumer privacy legislation and regulations. It performs this function by: obtaining authorization from a user of a network connected appliance to collect and provision to other entities consumer data resulting from the user's use of the appliance; collecting the consumer data; linking the collected consumer data with an appliance user anonymous identifier; communicating the consumer data and appliance user's anonymous identifier to a first entity, hereafter referred to as the Secure Consumer Data Exchange, or SCDE; analyzing the data at the SCDE by the use of one or more defined parameters; aggregating at the SCDE the appliance user's anonymous identifier with a set of appliance user anonymous identifiers linked with consumer data of other appliance users, thereby generating an aggregate set of appliance user anonymous identifiers, wherein each appliance user anonymous identifier included in the aggregate set points to an appliance user whose collected consumer data corresponds to at least one defined parameter in common with the collected consumer data of the other appliance users whose anonymous identifiers are included in the aggregate set; communicating the aggregate set from the SCDE to a second entity, such as an advertiser of goods or services, a publisher of news or commentary, or a creator of entertainment content; and providing the second entity with the ability to establish communications with the appliance user through the SCDE by use of the appliance user's anonymous identifier.

Figure 3:
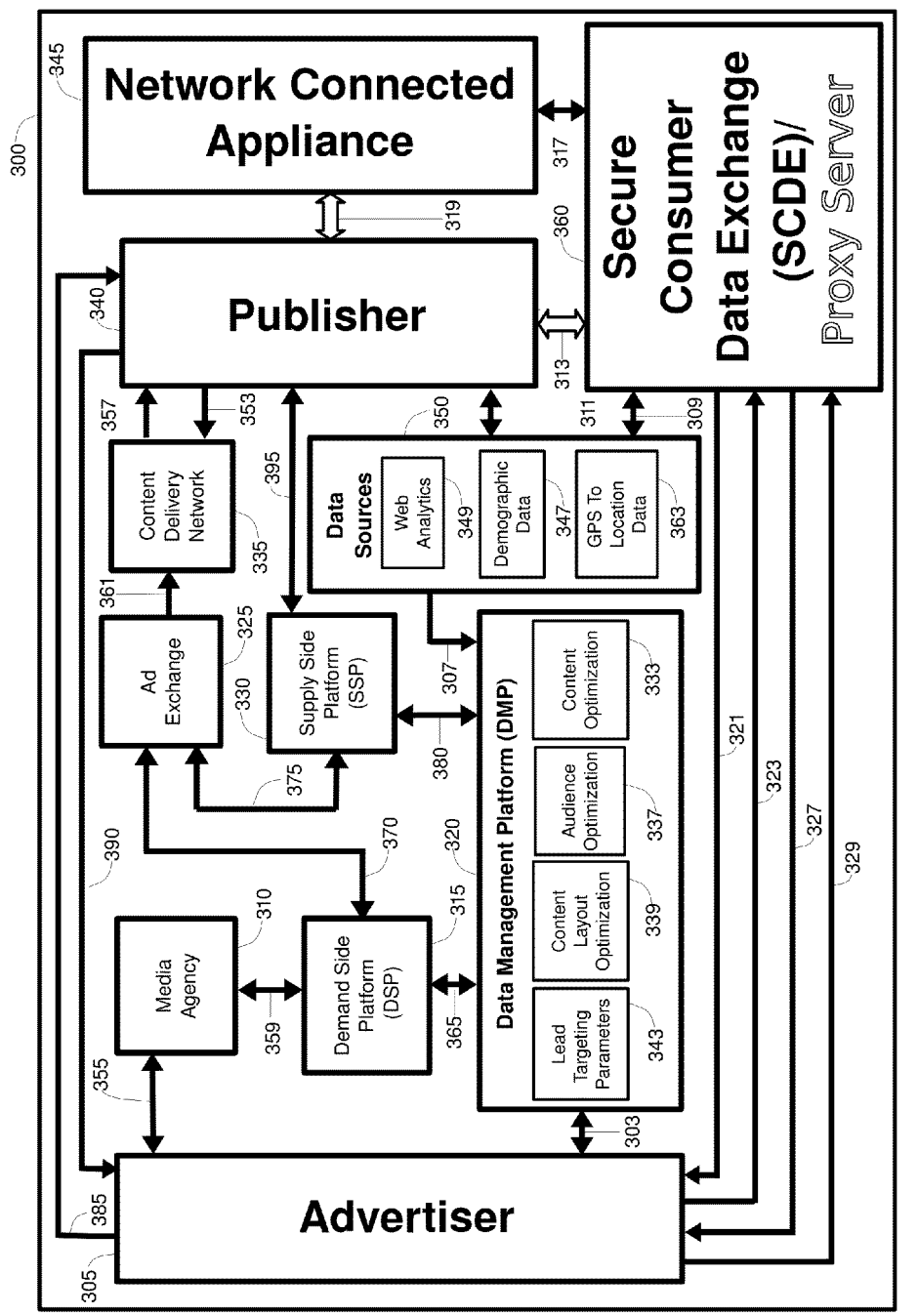
FIG. 3 is an online advertising transaction participant block diagram of an embodiment of the present invention.
Figure 4:
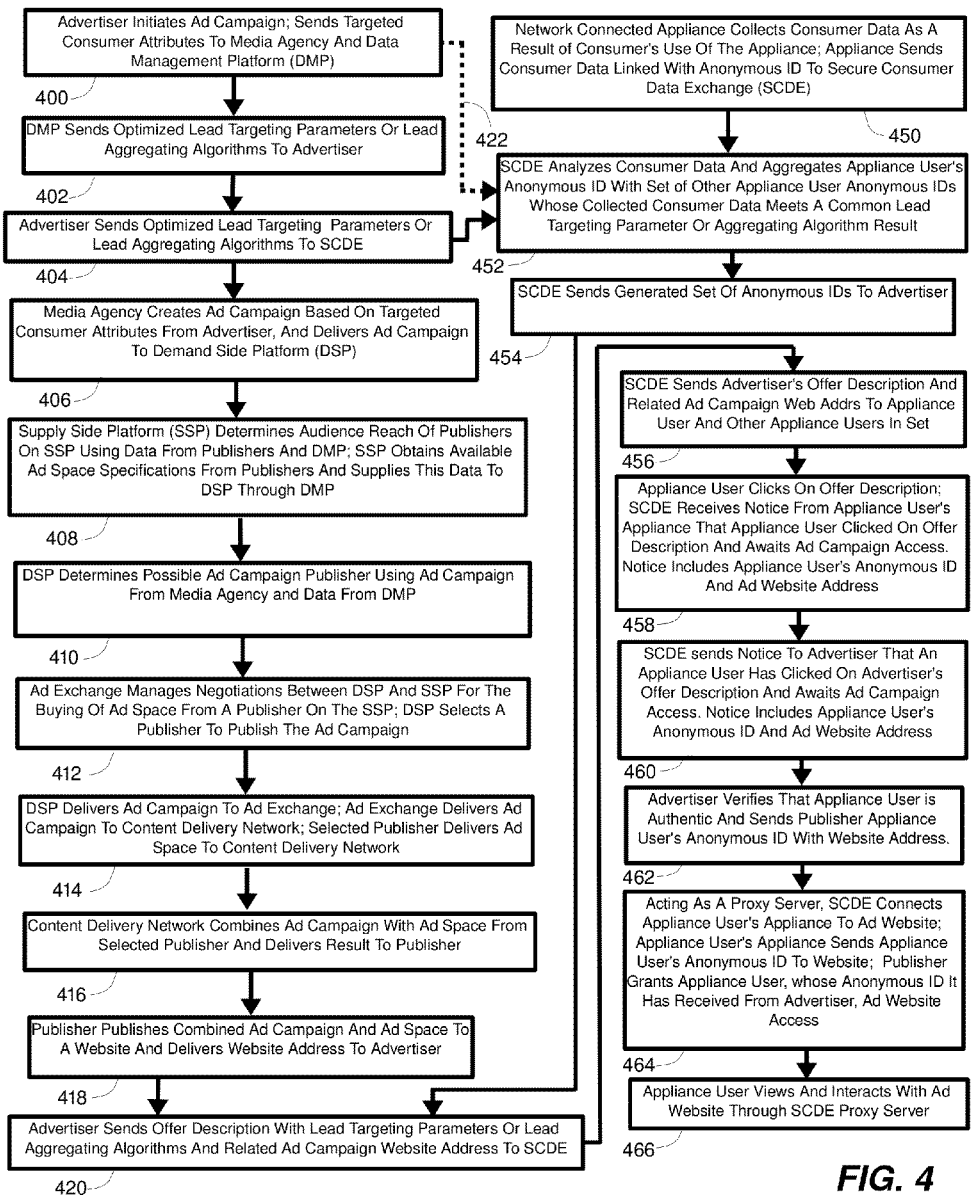
FIG. 4 is an online advertising transaction flowchart of an embodiment of the present invention.
Figure 5:
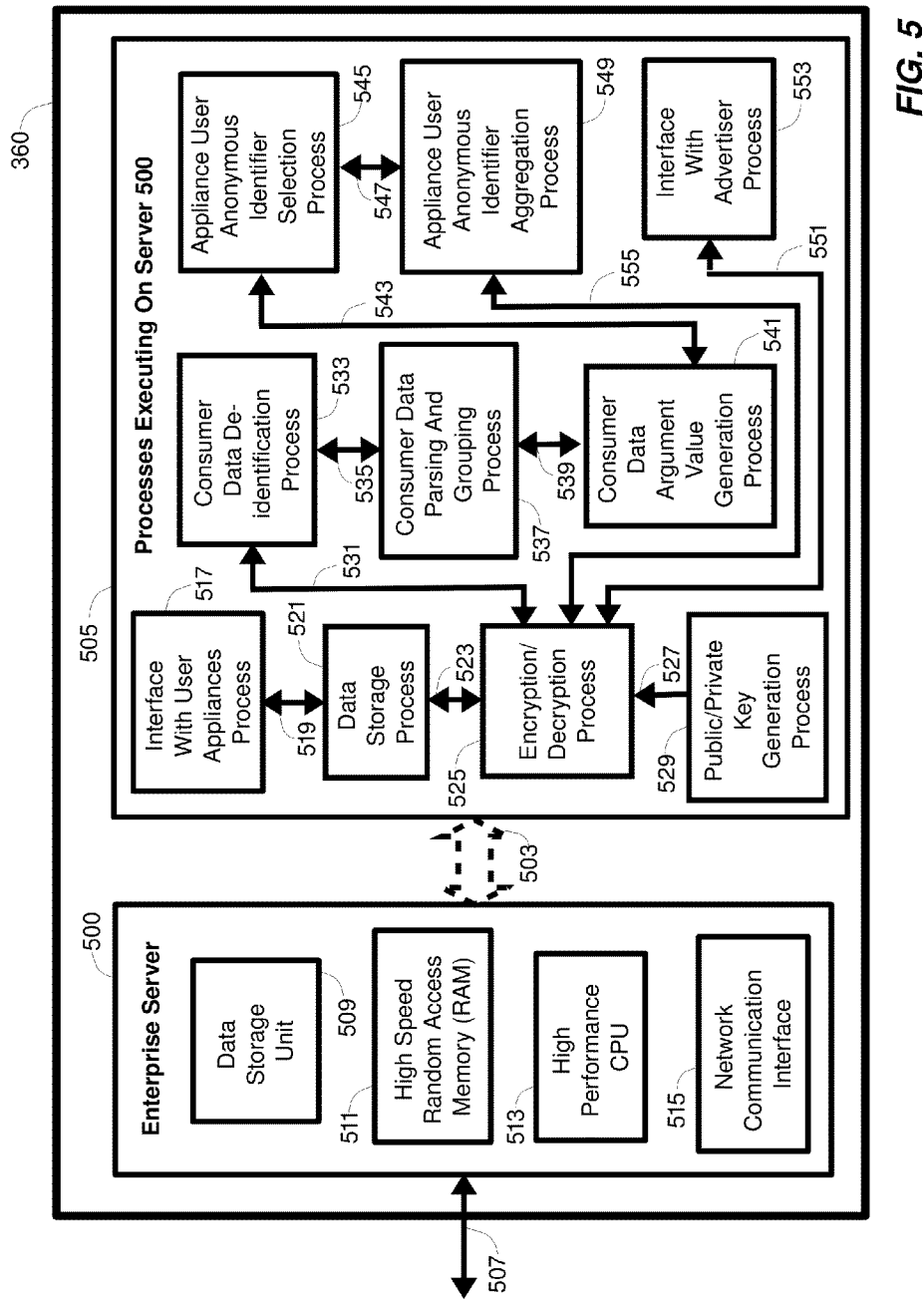
FIG. 5 is a block diagram of a Secure Consumer Data Exchange (SCDE) of the present invention.

The following example preferred embodiment of the present invention employs the teachings of the present invention to protect consumer privacy in the context of an online advertising transaction, wherein an advertiser can communicate highly effective offers to an individual, whose consumer data indicates a potentially heightened interest in a product or service being offered by the advertiser, without the advertiser having access to the individual's identity or consumer data. FIGS. 3 and 5, in conjunction with the flow chart of FIG. 4 are employed in the following discussion to illustrate a first embodiment of the present invention. FIG. 3 is a block diagram illustrating a first set of entities participating in an online advertising transaction of the present invention. FIG. 5 is a block diagram of a Secure Consumer Data Exchange (SCDE) of the present invention and FIG. 4 is a flow chart illustrating an online advertising transaction between the entities depicted in FIG. 3 that employs a first embodiment of the present invention. In this discussion, all reference numbers between 300 and 399 designate elements of FIG. 3, all reference numbers between 400 and 499 designate elements of FIG. 4, and all reference numbers between 500 and 599 designate elements of FIG. 5.

As can be seen from FIG. 3, the entities participating in the online advertising transaction of the present invention under discussion are Advertiser 305, Media Agency 310, Demand Side Platform (DSP) 315, Data Management Platform (DMP) 320, Supply Side Platform (SSP) 330, Data Sources 350, Ad Exchange 325, Content Delivery Network 335, Publisher 340, Secure Consumer Data Exchange (SCDE) 360, and Network Connected Appliance 345. Consumer data is collected by Network Connected Appliance 345 as a result of a consumer's use of the appliance and linked by Network Connected Appliance 345 with an appliance user anonymous identifier, as shown in Block 450 of FIG. 4. Collected consumer data may include, for example: the websites the appliance user visited; what news articles, entertainment content product descriptions and advertisements were clicked on by the appliance user; the search terms used by the appliance user while searching for internet content; what products or services were purchased by the appliance user online; what social networking websites, association websites, and blogs the appliance user visited; how long the appliance user remained connected to each website; the physical location of the appliance user at predetermined time intervals; and what "brick and mortar stores" the appliance user visited.

The appliance user collected consumer data and anonymous identifier is communicated over line 317 of FIG. 3 to SCDE 360. SCDE 360 analyzes the consumer data and aggregates the appliance user's anonymous identifier with a set of other appliance user anonymous identifiers whose collected consumer data corresponds to at least one common lead targeting parameter. The aggregation process is based on the results of the analysis. These actions are indicated by Block 452. Lead targeting parameters used in the analysis and aggregation processes can be directly communicated to SCDE 360 from Advertiser 305, or they can be communicated to SCDE 360 as consumer attributes. In either case, this data is communicated between Advertiser 305 and SCDE 360 over line 329. As used in this discussion, the term consumer attributes denotes characteristics inherent in the group of consumers Advertiser 305 wishes to target with their advertising campaign. Therefore, if Advertiser 305 wants to promote a new restaurant in Palo Alto, Calif., henceforth referred to as the "Palo Alto example", such consumer attributes could include: liking a wide variety of cuisines; enjoying 2 star or above restaurants; living, working, shopping, or dining in or in the vicinity of Palo Alto, Calif.; and, eating at restaurants often. Lead targeting parameters define consumer characteristics with greater specificity, and, in particular, assigns numeric quantities to these consumer characteristics. Therefore, such lead targeting parameters could include: visiting restaurant review websites (Yelp for example) at least once a week; viewing menus from Palo Alto restaurants whose prices range from $11 to $60 per meal without drinks; viewing 2 or more restaurant websites per month for more than 5 minutes each; viewing the websites of multiple restaurants, wherein at least 3 of the restaurants viewed serve different cuisines from each other; being physically in Palo Alto, or within 10 miles from Palo Alto, at least 3 times a week; and remaining at a location for between 30 and 90 minutes, at least once a week, where at such location at least 1 restaurant is known to be located. When Advertiser 305 communicates consumer attributes to SCDE 360, SCDE 360 may derive the needed lead targeting parameters from the provided consumer attributes in conjunction with additional data from Data Sources 350.

If Advertiser 305 wishes the aggregate set of appliance user anonymous identifiers generated by SCDE 305 to reflect a broad range and large number of appliance users, Advertiser 305 could ask SCDE 360 to include in the aggregate set the anonymous identifiers of all appliance users whose collected consumer data satisfies a single lead targeting parameter. For example, the aggregate set could be comprised of the anonymous identifiers of appliance users who are physically in Palo Alto, or within 10 miles from Palo Alto, at least 3 times a week. Should Advertiser 305 desire a more focused aggregate set of appliance user anonymous identifiers, SCDE 360 could employ a second lead targeting parameter in addition to the first lead targeting parameter. In this case, only the anonymous identifiers of appliance users whose collected consumer data satisfies both lead targeting parameters would be included in the set. Therefore, the more focused aggregate set of appliance user anonymous identifiers would only include the anonymous identifiers of appliance users who are physically in Palo Alto, or within 10 miles from Palo Alto, at least 3 times a week, and view 2 or more restaurant websites per month for more than 5 minutes each. Although 2 lead targeting identifier have been discussed, any number of lead targeting parameters could be employed in the analysis and aggregation processes making it possible to generate very focused sets of appliance user anonymous identifiers.

A selection algorithm can be employed by SCDE 360 for the selection of anonymous identifiers to be included in an aggregate set of anonymous identifiers. Such an algorithm could use numeric input arguments derived from lead targeting parameters to effect such selection. SCDE 360 could derive lead targeting parameters from consumer attributes provided by Advertiser 305, or the lead targeting parameters could be directly provided by Advertiser 305 to SCDE 360. As an alternative, Advertiser 305 could communicate the selection algorithm directly to SCDE 360. In all cases, the algorithm could use a single parameter, multiple parameters, but not all of the parameters available, or all of the parameters available, for the selection of anonymous identifiers to be included in the aggregate set of anonymous identifiers. In addition, the algorithm could assign weights to the parameters, such that some parameters have more influence on the selection results than others. Further, the algorithm could base the weighting of some of the parameters on the value of one or more of the other parameters.

The algorithm may be defined in the form of a computer procedure. Such a computer procedure is defined below, using the "Palo Alto example". In this example, written in the Scheme programming language conforming to the "Revised[5] Report on the Algorithmic Language Scheme", edited by Richard Kelsey, William Clinger, and Jonathan Rees, dated Feb. 20, 1998, the computer procedure is written as a Scheme "predicate". By convention, Scheme procedures that always return a Boolean as their value are called predicates and their names usually end in "?". The defined Scheme predicate "add-to-aggregate-set?" employs numeric input arguments whose ranges are predetermined. The procedure returns "#t", the Scheme notation for "True", should the calculated value derived from the numeric input arguments included in the call to the procedure equal or exceed a threshold value and meet some other criteria, and "#f", the Scheme notation for "False", should the calculated value derived from the numeric input arguments included in the call to the procedure not equal or exceed a threshold value or not meet some other criteria, If the procedure indicates #t, the appliance user's anonymous identifier is included in the aggregate set of appliance user anonymous identifiers generated by SCDE 360 and communicated to Advertiser 305 over line 327. If the procedure indicates #f, the appliance user's anonymous identifier is not included in the aggregate set of appliance user anonymous identifiers generated by SCDE 360 and communicated to Advertiser 305 over line 327.

In the following example Scheme procedure ap1 through ap6, w1 through w6, "apmax" and "portion" are arguments included in the call to the procedure. In the case of the arguments ap1 through ap6, each of these arguments indicates the degree the appliance user's collected consumer data satisfies a lead targeting parameter used in the "Palo Alto example". Specifically:

ap1=a number from 0 to 100, where 0 indicates the appliance user's collected consumer data shows the appliance user does not visit restaurant review websites, and 100 means the appliance user's collected consumer data shows, on average, the appliance user visits at least 10 restaurant review websites per month;

ap2=a number from 0 to 100, where 0 indicates the appliance user's collected consumer data shows the appliance user does not view Palo Alto restaurant menus whose prices range from $11 to $60 per meal without drinks online, and 100 indicates the appliance user's collected consumer data shows the appliance user views, on average, Palo Alto restaurant menus whose prices range from $11 to $60 per meal without drinks online at least 5 times per month;

ap3=a number from 0 to 100, where 0 indicates the appliance user's collected consumer data shows the appliance does not view restaurant websites and 100 indicates the appliance user's collected consumer data shows the appliance user views, on average, at least 10 restaurant websites, for more than 5 minutes each, per month;

ap4=a number from 0 to 100, where 0 indicates the appliance user's collected consumer data shows the appliance user always views the websites of restaurants that serve the same type of cuisine, and 100 indicates the appliance user's collected consumer data shows the appliance user views, over a period of 3 months, the websites of at least 5 restaurants whose cuisines are different from each other;

ap5=a number from 0 to 100, where 0 indicates the appliance user's collected consumer data shows the appliance user is never physically in Palo Alto, or within 10 miles from Palo Alto, and 100 indicates the appliance user's collected consumer data shows the appliance user is physically in Palo Alto, or within 10 miles from Palo Alto at least 5 times per week;

ap6=a number from 0 to 100, where 0 indicates the appliance user's collected consumer data shows the appliance user never remains at a location for between 30 and 90 minutes, where at such location at least 1 restaurant is known to be located, and 100 indicates the appliance user's collected consumer data shows the appliance user remains at a location for between 30 and 90 minutes, where at such location at least 1 restaurant is known to be located, at least 3 times per week.

In the case of the arguments w1 through w6, each of these arguments are weights assigned to procedure arguments ap1 through ap6. These weights alter the influence each ap argument has on the result of the procedure. Specifically:

w1, w2, w3, w4, w5, w6 are ap1, ap2, ap3, ap4, ap5, ap6 argument weightings respectively, each with a value from 0 to 2, where 0 indicates that 0% of the ap argument's value influences the procedure result and 2 indicates that 200% of the ap argument's value influences the procedure result.

In the case of the argument "apmax", this argument is the maximum value assigned to each lead targeting parameter. In the example Scheme procedure, each lead targeting parameter is assigned the same maximum value, the minimum being 0, so only one apmax value is used.

In the case of the argument "portion", this argument is a number between 0 and 1. The sum of maximum lead targeting parameter values, assigned to the variable "tapmax" in the example Scheme procedure, multiplied by "portion" equals the threshold value that needs to be attained or exceeded for the consumer's anonymous identifier to be included in the aggregate set of consumer anonymous identifiers.

The example Scheme procedure is defined as follows:
(define add-to-aggregate-set?
 (lambda (apmax portion ap1 w1 ap2 w2 ap3 w3 ap4 w4 ap5 w5 ap6 w6)
 ; weight targeted consumer parameters; calculate "total apmax"=tapmax
  (let* ((ap1w (* ap1 w1)) (ap2w (* ap2 w2))
    (ap3w (* ap3 w3)) (ap4w (* ap4 w4))
    (ap5w (* ap5 w5)) (ap6w (* ap6 w6))
    (tapmax (* apmax (length (list ap1 ap2 ap3 ap4 ap5 ap6)))))
 ; add appliance user anonymous identifier to aggregate set?
  (cond
   ((and (>=ap1w 50)
    (>=ap4w 60)
    (>=ap6w 33)
    (>=(+ap1w ap2w ap3w ap4w ap5w ap6w) (* tapmax portion)))
   #t); yes, add anonymous identifier
   (else #f))))); no, do not add anonymous identifier In the above example Scheme procedure, the values of ap1, ap2, ap3, ap4, ap5, and ap6, are obtained from the analysis of the appliance user's collected consumer data received over line 317. As previously stated, ap1 is defined as a number from 0 to 100, where 0 indicates the appliance user's collected consumer data shows the appliance user does not visit restaurant review websites, and 100 means the appliance user's collected consumer data shows, on average, the appliance user visits at least 10 restaurant review websites per month. Therefore, for collected appliance user consumer data that, when analyzed, shows the appliance user visits, on average, 5 restaurant review websites per month, ap1 could be assigned a value of 50 as a result of the analysis process.

Using the descriptions in the previous paragraphs for ap2 through ap6, and reasoning similar to that employed in the previous paragraph to assign a value to ap1, values could be assigned to ap2 through ap6 as follows:

a) If the collected appliance user's consumer data shows that the appliance user views, on average, Palo Alto restaurant menus whose prices range from $11 to $60 per meal without drinks online at least 2 times per month, ap2 could be assigned a value of 40 as a result of the analysis process;

b) If the collected appliance user's consumer data shows that the appliance user views, on average, at least 5 restaurant websites, for more than 5 minutes each, per month ap3 could be assigned a value of 50 as a result of the analysis process;

c) If the collected appliance user's consumer data shows that the appliance user views, over a period of 3 months, the websites of 3 restaurants whose cuisines are different from each other, ap4 could be assigned a value of 60 as a result of the analysis process;

d) If the collected appliance user's consumer data shows that the appliance user is physically in Palo Alto, or within 10 miles from Palo Alto, 2 times per week, apt 5 could be assigned a value of 40 as a result of the analysis process; and e) If the collected appliance user's consumer data shows that the appliance user remains at a location for between 30 and 90 minutes, where at such location at least 1 restaurant is known to be located, 1 time per week, apt 6 could be assigned a value of 33 as a result of the analysis process.

The values of arguments w1, w2, w3, w4, w5, and w6, alter the importance of arguments ap1, ap2, ap3, ap4, ap5 and ap6 respectively. The more important an "ap" argument is the greater the influence it has on the result of the "add-to-aggregate-set?" procedure. For example, Advertiser 305 may voice a desire to SCDE 360 to increase the number of anonymous identifiers in the aggregate set that are linked to the consumer data of appliance users who are physically in Palo Alto, or within 10 miles from Palo Alto on at least a weekly basis. This can be accomplished by changing the value of argument w5. If, for example, w5 was 1.0, argument ap5's effective influence on the result of the procedure would be 100% of its numerical value. By increasing w5 to 1.3, ap5's effective influence on attaining or exceeded the threshold value that needs to be reached for the consumer's anonymous identifier to be included in the aggregate set of consumer anonymous identifiers communicated to Advertiser 305, would be increased by 30% to 130% of its numerical value. Thus, the number of anonymous identifiers in the aggregate set that are linked to the consumer data of appliance users who are physically in Palo Alto, or within 10 miles from Palo Alto on at least a weekly basis would increase.

The value of the argument "apmax" sets the maximum value of arguments ap1, ap2, ap3, ap4, ap5 and ap6. For ease of discussion, the "add-to-aggregate-set?" procedure is written such that all the "ap" arguments have the same maximum value, where this value is set by the use of a single "apmax" argument. In general, this need not be the case. The procedure could have been written to allow the maximum value of each "ap" argument to be different and set by separate arguments in the procedure call. Although "apmax" can be any value, a good value for the example procedure under discussion would be 100.

The value of the argument "portion" determines the threshold value that needs to be attained or exceeded for the appliance user's anonymous identifier to be included in the aggregate set of appliance user anonymous identifiers. An inspection of the "add-to-aggregate-set?" procedure's Scheme code shows how the argument "portion" plays this role. The Scheme code fragment:

(>=(+ap1w ap2w ap3w ap4w ap5w ap6w) (* tapmax portion))

calls for multiplying variable "tapmax" by argument "portion", where "tapmax" has been previously set in the procedure to:

(tapmax (* apmax (length (list ap1 ap2 ap3 ap4 ap5 ap6))))

or, using mathematical notation, to tapmax=(apmax*the number of ap arguments). Since, for this example, apmax is the same value for each lead targeting parameter used in the procedure, tapmax is the sum of maximum lead targeting parameter values used in the "add-to-aggregate-set?" procedure. Referring back to the Scheme code fragment above, it can be seen that the argument "portion" has the effect of setting the value that needs to be attained or exceeded for the appliance user's anonymous identifier to be included in the aggregate set of appliance user's anonymous identifiers, since if the sum of weighted arguments apw1, apw2 apw3, apw4, apw5 and apw6 is equal to or exceeds (* tapmax portion), Or in mathematical notion (tapmax*portion), the appliance user's anonymous identifier is included in the aggregate set. If it does not the appliance user's anonymous identifier is not included.

To demonstrate how the argument "portion" acts to set the threshold value and thereby alter the number of appliance user anonymous identifiers included in the set of anonymous identifiers communicated to Advertiser 305, recall that In the call to the "add-to-aggregate-set?" procedure there are 6 arguments, ap1-ap6. These six arguments are derived from an analysis of the appliance user's collected consumer data based on 6 lead targeting parameters that are either provided directly to SCDE 360 by Advertiser 305, or derived by SCDE 360 from consumer attributes provided by Advertiser 305. Also recall that a good value for "apmax" is 100. Letting apmax equal 100 causes "tapmax" to equal 600, a constant value throughout the execution of the procedure. If the argument "portion" is chosen to be 0.50, the threshold value that needs to be attained or exceeded for the appliance user's anonymous identifier to be included in the aggregate set of appliance user anonymous identifiers communicated to Advertiser 305, is 300. Lowering the value of "portion" to, for example, 0.25, decreases the threshold value to 150 and thereby potentially increases the number of appliance user anonymous identifier's included in the aggregate set of anonymous identifiers by as much as 1.5 times. The actual amount of increase depends on a number of factors including: the number of appliance user consumer data sets included in the consumer data analysis being performed, the distribution uniformity of the consumer data relating to each of the lead targeting parameters, and the number of lead targeting parameters being used in the analysis.

Included in the "add-to-aggregate-set?" procedure is another filtering process to further focus the generated aggregate set of anonymous appliance user identifiers in accordance with Advertiser 305's wishes. This filtering process is embodied in the following Scheme code fragment:

(and (>=ap1w 50)
   (>=ap4w 60)
   (>=ap6w 33)
   (>=(+ap1w ap2w ap3w ap4w ap5w ap6w) (* tapmax portion)))

The last line of the "and" statement is the code fragment discussed in the preceding 2 paragraphs. For this "and" statement to result in a #t output, and thereby cause the execution of the "add-to-aggregate-set?" procedure to result in a #t output, all lines of the statement must be true. Specifically, ap1w must be greater than or equal to 50, apw4 must be greater than or equal to 60, apw6 must be greater than or equal to 33 and the sum of ap1w through ap6w must be greater than or equal to (tapmax*portion). Assuming the last line of the "and" statement is satisfied and the weights applied to arguments ap1, ap4 and ap6 are 1, Advertiser 305 could request, for example, that the aggregate set of appliance user anonymous identifiers they receive at least include the anonymous identifiers of appliance users whose consumer data indicates that the appliance user visits, on average, 5 restaurant review websites per month (ap1w>=50), the appliance user views, over a period of 3 months, the websites of 3 restaurants whose cuisines are different from each other (ap4w>=60), and the appliance user remains at a location for between 30 and 90 minutes, where at such location at least 1 restaurant is known to be located, 1 time per week (apt6w>=33).

As previously discussed, "add-to-aggregate-set?" procedure argument values ap1 through ap6 are generated by the analysis of appliance user consumer data communicated to SCDE 360 on line 317 from Network Connected Appliance 345. Since Appliance 345 has access to internet downloaded, appliance user generated, appliance user location, and application generated data sources, among other data sources, consumer data may be collected by Appliance 345 in many different formats. Such source formats could include text, xml, sgml, html, portable document format (pdf), and Open Document Format (ODF), to name a few. For ease of analysis by SCDE 360, data in these disparate formats is converted by Appliance 345 into a common format before being communicated to SCDE 360, although SCDE 360 could receive variably formatted data from Appliance 345 and convert the data into a common format for analysis. In the embodiments of the present invention herein discussed, Appliance 345 converts collected consumer data into the comma delimited Comma Separated Value (CSV) text file format, where each data element is separated from the following data element by an ASCII comma character. Other data file formats could be used. In these illustrative embodiments the first data element of the CSV text file communicated to SCDE 360 from Appliance 345 is the appliance user's anonymous identifier, although the appliance user's anonymous identifier could appear as the last element of the file, or in any predefined position of the file. This first element is followed by a second time stamp data element, where the time stamp data is generated by Appliance 345's real time clock and designates the date and time the following data element was collected by Appliance 345. The third element of the CSV text file contains a first collected consumer data element. The fourth element is a time stamp data value element, and the fifth element is a second collected consumer data element. The pattern of time stamp data element followed by collected consumer data element continues throughout the rest of the file. The collected consumer data element could contain, for example, the Universal Resource Locator (URL) address of a web page on the world wide web visited by the appliance user, the URL of a hyperlink on the visited web page over which the appliance's pointing device passed or the appliance user clicked on, the length of time the appliance user remained on a particular web page, the Universal Product Code (UPC) of a product or service purchased by the appliance user while using the appliance, the Global Positioning System (GPS) coordinates of the appliance user at the location where the appliance user is using the appliance, or the appliance user's location coordinates derived from the positions of cell towers and Wi-Fi access points at the location where the appliance user is using the appliance. The collected consumer data element could also contain other data related to the appliance user's use of the appliance. After collecting appliance user consumer data for a predetermined period of time, and forming one or move CSV text files, each containing collected appliance user consumer data and the appliance user's anonymous identifier, Appliance 345 encrypts the data and communicates the encrypted data to SCDE 360.

SCDE 360 receives the encrypted CSV files from Appliance 345, stores the files in encrypted form on Data Storage Unit 509 of FIG. 5, and decrypts the files when required, readying the appliance user consumer data contained in the CSV files for analysis. Strictly speaking, the storage of received appliance user consumer data from Appliance 345 in encrypted form is not required. However, such encrypted data storage increases the security of the data stored on Data Storage Unit 509, which is an important factor in facilitating compliance with government consumer privacy legislation and regulations. The SCDE 360 actions to be discussed, are performed on Enterprise Server 500 of FIG. 5 as controlled by processes executed on Server 500. Dashed outlined double headed Arrow 503 indicates that Processes 505, which take the physical form of software stored on Data Storage Unit 509 of Server 500, are executed on High Performance CPU 513 of Server 500 to effect such control. As shown in FIG. 5, these actions are controlled by Interface With User Appliance Process 517 that uses Network Communication Interface 515 in conjunction with Network Connection 507, Data Storage Process 521, and Encryption/Decryption Process 525, respectively. Inter-process Communication 519 serves as the data conduit between Process 517 and Process 521, and Inter-process Communication 523 serves as the data conduit between Process 521 and Process 525. Consumer Data De-Identification Process 533 receives decrypted CSV file data through Inter-process Communication 531 from Encryption/Decryption Process 525 and performs de-identification processing of the consumer data contained within the decrypted CSV file. Such de-identification processing is performed if de-identification was not already effected by Appliance 345 before the encrypted CSV file was communicated to SCDE 360.

The following 4 processes, Consumer Data Parsing And Grouping Process 537, Consumer Data Argument Generation Process 541, Appliance User Anonymous Identifier Selection Process 545, and Appliance User Anonymous Identifier Aggregation Process 549, comprise the 4 stages of appliance user collected consumer data analysis performed by SCDE 360. The de-identified Consumer data in the form of decrypted and de-identified CSV text file data is output from Process 533 and communicated through Inter-process Communication 535 to Process 537 where it is parsed and grouped into lead targeting parameter categories. To illustrate using the "Palo Alto example", the categories could be chosen to correspond to the definitions of arguments ap1-ap6 of the "add-to-aggregate-set?" procedure discussed above. Many text data search programs, such as sgrep and agrep, in combination with scripting languages such as Python, Ruby, Perl. Tcl, Guile, Gauche, and Scsh can be employed to perform this parsing and grouping. The resulting output from Process 537, is a CSV text file where the first data element of the CSV text file is the appliance user's anonymous identifier, the second element is the time stamp data element generated by Appliance 345's real time clock that indicates the date and time the following data element was collected by Appliance 345, and the third element is a collected consumer data element. However, the CSV text file's time stamp data and collected consumer data elements are now grouped in accordance with the definitions of arguments ap1-ap6. Such groupings could be delimited by 2 empty element positions in a row, in other words 3 commas directly following one another. As a simplified example, let all ap arguments be equal to zero except for arguments ap1 and ap6. Recall that argument ap1 is defined as: a number from 0 to 100, where 0 indicates the appliance user's collected consumer data shows the appliance user does not visit restaurant review websites, and 100 means the appliance user's collected consumer data shows, on average, the appliance user visits at least 10 restaurant review websites per month. Also recall that argument ap6 is defined as: a number from 0 to 100, where 0 indicates the appliance user's collected consumer data shows the appliance user never remains at a physical location for between 30 and 90 minutes, where at such location at least 1 restaurant is known to be located, and 100 indicates the appliance user's collected consumer data shows the appliance user remains at a physical location for between 30 and 90 minutes, where at such location at least 1 restaurant is known to be located, at least 3 times per week. With ap arguments ap2-ap5 being equal to zero, process 537 purges all collected consumer data not relating to the definitions of arguments ap1 and ap6 from the data output communicated to the following data analysis process. In this case that is Consumer Data Argument Generation Process 541. Thus, the CSV text file output from Process 537 may contain a sequence of data elements where the first data element contains the appliance user's anonymous identifier, the second data element contains the time at which the appliance user visited a restaurant review website, the third data element contains the URL of the restaurant review website visited, the fourth data element contains the time at which the appliance user visited a restaurant website, and the fifth data element contains the URL of the restaurant review website visited, which may be the same URL as appeared in the third data element if the appliance user was still visiting the same website when the next appliance user consumer data sample was collected. This sequence continues until no more data pertaining to the definition of ap1 appears in the CSV text file input to Process 537. Immediately following the last data element pertaining to the definition of ap1 could be 3 commas in a row, to indicate that appliance user consumer data related to another ap argument definition, in this case ap6, will now appear in the CSV text file. In accordance with the definition of ap6, the next data element in the sequence contains the time the data element was collected, and the following data element in the sequence contains the GPS coordinates of the appliance user's location at the time of consumer data collection. This sequence repeats at the consumer data collection rate until the end of the file.

The parsed and grouped appliance user consumer data CSV text file generated by Process 537 is communicated through Inter-process Communication 539 to Process 541. Process 541 first gathers statistics associated with the consumer data. These statistics may include, but not be limited to, a tabulation of the number of restaurant review websites the appliance user physically visited over the time period during which the data contained in the CSV text file was collected, the number of different locations the appliance user visited over the time period during which the data contained in the CSV text file was collected, the number of times the appliance user visited each location over the time period during which the data contained in the CSV text file was collected, the date and time the appliance user visited the location, the length of time the appliance user remained at each location, and the GPS coordinates of the locations the appliance user remained at for more than 30 minutes but less than 90 minutes. The tabulated data is then analyzed for the purpose of generating consumer data argument values. In this case only arguments ap1 and ap6 are generated because, as previously discussed, all arguments except for arguments ap1 and ap6 have been set to 0 for this simplified example. For the generation of the value of argument ap1, the analysis could employ the number of restaurant review websites the appliance user visited over a period of time. This data is contained in the tabulated consumer data from one or more CSV text files. Given the definition of argument ap1, if the tabulated appliance user consumer data being analyzed shows the appliance user visited, on average, 5 restaurant review websites per month, ap1 could be assigned a value of 50 as a result of the analysis process. For the generation of the value of argument ap6, the analysis could employ the number of different locations the appliance user physically visited, the number of times the appliance user visited each location, the date and time the appliance user visited the location, the length of time the appliance user remained at each location, and the GPS coordinates of the locations the appliance user remained at for more than 30 minutes but less than 90 minutes. This data is contained in the tabulated consumer data from one or more CSV text files. Given the definition of argument ap6, if the tabulated appliance user consumer data being analyzed shows the appliance user remained at a location for between 30 and 90 minutes, where at such location at least 1 restaurant is known to be located, 1 time per week, apt 6 could be assigned a value of 33 as a result of the analysis process. In order to determine if at least 1 restaurant is located at a location physical visited by the appliance user, the analysis performed by Process 541 could use data obtained by SCDE 360 from Data Sources 350 over line 309. In this example, Data Sources 350, provides, among other data, data listing businesses located at or within walking distance from submitted GPS coordinates.

The generated ap argument values are output from Process 541 and communicated through Inter-process Communication 543 to Process 545 along with the appliance user's anonymous identifier. Process 545 employs the communicated ap argument values to determine whether the appliance user's anonymous identifier should be aggregated with a set of other appliance user anonymous identifiers. Process 545 selects the appliance user's anonymous identifier for aggregation if one or more ap argument values derived from the appliance user's collected consumer data is within a predefined ap value range, where each ap argument may utilize a different ap value range. If one or more ap values are not within their predefined range the appliance user's anonymous identifier is not selected for aggregation. The number of ap argument values used could be defined by Advertiser 305 or SCDE 360, and depends on how focused the anonymous identifier selection process is to be. The more ap argument value ranges that need to be satisfied, the more focused the anonymous identifier selection process. A more focused anonymous identifier selection process causes a lower number of anonymous identifiers to be selected for inclusion in the aggregate set of anonymous identifiers. Recall that in this discussion ap argument values indicate the degree the appliance user's collected consumer data satisfies a lead targeting parameter either directly supplied by Advertiser 305 or derived from consumer attributes supplied by Advertiser 305. The ap value ranges used by Process 545 may be empirically defined, or based on data provided to SCDE 360 from Data Sources 350 over Line 309, where such data may include demographic data, GPS to location data, web analysis data, other data, or a combination thereof. In general, if at least one ap argument value derived from the appliance user's consumer data is in common with the values of its counterpart ap arguments derived from the consumer data of the appliance users whose anonymous identifiers are included in the aggregate set of anonymous identifiers, i.e., falls within the same predefined range, the appliance user's anonymous identifier may be selected for inclusion in the aggregate set of appliance user anonymous identifiers. Previously discussed Scheme procedure "add-to-aggregate-set?" can be used by Process 545 for such appliance user's anonymous identifier selection.

The selected appliance user anonymous identifier is output from Process 545 and communicated through Inter-process Communication 547 to Process 549. Process 549 also receives a file containing the set of appliance user anonymous identifiers to which the appliance user's anonymous identifier is be aggregated with, from Process 525 through Inter-process Communication 555. The set may be contained in a text file where each appliance user anonymous identifier is separated from the following identifier by an ASCII line feed character thus causing each identifier to reside on a separate line of the file when the file is viewed, a comma delimited CSV text file where each anonymous identifier is separated from the following identifier by an ASCII comma character, or any other data carrying file capable of being sorted and added to. Prior to communicating the file to Process 549, Process 525 decrypts the file. Such decryption is necessary because, in this example, the file containing the set of appliance user anonymous identifiers is stored in Data Storage Unit 509 in encrypted form and retrieved by Data Storage Process 521 from Data Storage Unit 509 in encrypted form. Strictly speaking, the storage of appliance user anonymous identifiers in encrypted form is not required. However, such encrypted data storage increases the security of the data stored on Data Storage Unit 509, which is an important factor in facilitating compliance with government consumer privacy legislation and regulations. Thus, Process 525 needs to decrypt the file containing the set of anonymous identifiers received from Process 521 through Inter-process Communication 523 prior to communicating the file to Process 549. Subsequent to receiving the decrypted file, Process 549 concatenates the selected appliance user anonymous identifier with the set of appliance user anonymous identifiers contained in the received file. Although concatenation is specified in this example, other combinatorial approaches can be employed to effect the aggregation. The resulting aggregate set of anonymous identifiers may then be sorted in various ways, such as in ascending or descending anonymous identifier order. Such sorting may be effected for the purpose of facilitating the use of the aggregate set of identifiers.

The aggregate set of appliance user anonymous identifiers is output from Process 549 in the form, for example, of a comma delimited CSV text file and communicated to Process 525 through Inter-process Communication 555. In the following discussion, Process 525 encrypts the file using public/private key cryptography, although encryption based on other cryptography approaches can be employed. The file is encrypted in order to be able to communicate the file to Advertiser 305 as securely as possible. Strictly speaking, communicating the CSV text file containing the aggregate set of appliance user anonymous identifiers in encrypted form to Advertiser 305 is not required. However, encrypting the file increases the security of the data stored in the file and prevents entities other than Advertiser 305 from reading the file. These are important factors in facilitating compliance with government consumer privacy legislation and regulations. Pretty Good Privacy (PGP) or Gnu Privacy Guard (GnuPG), as well as other public/private key software programs, can be used for encrypting the CSV text file. Public-key cryptography refers to a cryptographic system that uses a key pair, one key of the pair is private and the other key of the pair is public. In this example, the public key is used to encrypt the CSV text file, and the private key is used to decrypt the encrypted CSV text file. Although different, the two keys of the key pair are mathematically linked, but one cannot be derived from the other. Therefore, the public key can be communicated "in the clear" without being protected in any way, as long as the private key remains a secret of the key owner. Prior to CSV file encryption, Advertiser 305 communicates their public key to SCDE 360. Any form of non-secure communication can be used for this communication, email being an example. Since Advertiser 305 is the only entity that possesses the private key of the key pair, Advertiser 305 is the only entity capable of decrypting the encrypted CSV text file. After encryption with Advertiser 305's public key, Process 525 communicates the encrypted CSV text file through Inter-process Communication 551 to Interface With Advertiser Process 553. Process 553 in conjunction with Network Communication Interface 515 and Network Connection 507 then communicates the encrypted CSV text file containing the aggregate set of appliance user anonymous identifiers to Advertiser 305 as shown in Block 454 of FIG. 4.

In addition to encrypting the unencrypted CSV text file received from Process 549 with Advertiser 305's public key, thereby making a first encrypted CSV text file containing the aggregate set of appliance user anonymous identifiers, Process 525 encrypts the CSV text file with SCDE 360's public key, thereby making a second encrypted CSV text file containing the aggregate set of appliance user anonymous identifiers. Process 525 communicates this second encrypted CSV text file to Data Storage Process 521 through Inter-process Communication 523. Data Storage Process 521 effects the file's storage on Storage Unit 509 for later use.

As discussed above, and indicated by dotted line 422 of FIG. 4, the lead targeting parameters or aggregating algorithms used by SCDE 360 for the analysis and aggregation of anonymous identifiers could be derived by SCDE 360 from a definition of targeted consumer attributes supplied to SCDE 360 by Advertiser 305, where such consumer attributes define the consumers Advertiser 305 wishes to target with its advertising campaign. However, Advertiser 305 may choose to provide targeted consumer attributes to a data management platform, such as DMP 320 of FIG. 3, in order to obtain lead targeting parameters or aggregating algorithms, and provide the DMP 320 derived parameters or algorithms to SCDE 360. FIG. 3 in conjunction with FIG. 4 illustrates an online advertising transaction of the first embodiment of the present invention, which follows this approach. As shown in FIGS. 3 and 4, Advertiser 305 of FIG. 3 initiates its advertising campaign in Block 400 of FIG. 4 by generating a targeted consumer attributes definition, communicating the attributes definition to media agency 310 over line 355, and communicating the attributes definition to DMP 320 over line 303. In Block 402, DMP 320 sends to Advertiser 305 optimized lead targeting parameters or lead aggregating algorithms, and in Block 404 Advertiser 305 communicates the optimized lead targeting parameters or lead aggregating algorithms received from DMP 320 to SCDE 360 over line 329. In Block 406, Media Agency 310 employs the targeted consumer attributes provided by Advertiser 305 to create an ad campaign and delivers the ad campaign to DSP 315 over line 359. DSP 315's function is to determine the ad campaign publishers that will be most effective, negotiate the best price, ad placement, and ad timing with selected publishers, and ultimately place the ad campaign with a publisher. To do so, DSP 315 needs to analyze ad campaign characteristics, the ad campaign's intended audience, available ad space cost, and the audience reach of available ad campaign publishers. The information required by DSP 315 to perform this analysis is obtained from the ad campaign itself and interaction with DMP 320. As shown in Block 408, SSP 330 determines the audience reach of publishers on its platform, using data from the publishers and data from DMP 320 received over Line 380. Through communication with their publishers, SSP 330 also determines what ad space its publishers have available, the ad spaces' specifications and the ad spaces' starting price. SSP 330 supplies this data to DMP 320 through Line 380. DMP 320 supplies the data received from SSP 330 to DSP 315 through Line 365. In Block 410, DSP 315 determines the publishers on SSP 330's platform that could most effectively publish the ad campaign and initiates negotiations with SSP 330 through Ad Exchange 325, as indicated by Lines 370 and 375 of FIG. 3. As shown in Block 412, Ad Exchange 325 manages the negotiations between DSP 315 and SSP 330 for the buying of ad space from a publisher on SSP 330's platform. At the conclusion of the negotiations, DSP selects a publisher to publish the ad campaign. Once a publisher is selected, DSP 315 delivers the ad campaign to Ad Exchange 325 over line 370, Ad Exchange 325 delivers the ad campaign to Content Delivery Network 335 over Line 361, Content Delivery Network 335 informs selected publisher Publisher 340, over Line 357, that Publisher 340 has been selected by DSP 315, and Publisher 340 delivers the ad space to Content Delivery Network 335 over line 353, as shown in Block 414 of FIG. 4. In Block 416 of FIG. 4, Content Delivery Network 335 of FIG. 3 combines the ad campaign from Ad Exchange 325 with the ad space received from Publisher 340 and delivers the result to Publisher 340 over line 357. Publisher 340 then publishes the combined ad campaign and ad space to a website and delivers the website address to Advertiser 305 over Line 390 as shown in Block 418.

In Block 420, Advertiser 305 sends a description of an offer for goods or services, with the lead targeting parameters or lead aggregating algorithms associated with the offer, and the related ad campaign website address, to SCDE 360. The associated lead targeting parameters, or lead aggregating algorithms, are communicated to SCDE 360 to allow SCDE 360 to determine the group of appliance users Advertiser 305's offer description and related ad campaign website address should be communicated to. This determination is effected by comparing the lead targeting parameters or lead aggregating algorithms received from Advertiser 305 with the lead targeting parameters or lead aggregating algorithms used to generate each aggregate set of appliance user anonymous identifiers stored in encrypted form on Data Storage Unit 509 of FIG. 5. As shown in Block 456, if the relevant aggregate set of identifiers is determined to be the set that includes the anonymous identifier of the user of Appliance 345, SCDE 360 communicates Advertiser 305's offer description and related ad campaign website address to Network Connected Appliance 345, over line 317, as well as to the network connected appliances of the other appliance users whose anonymous identifiers are included in the aggregate set. There are many ways for SCDE 360 to effect this communication. One such way, is for SCDE 360 to communicate Advertiser 305's offer description and related ad campaign website address to Appliance 345 at the time SCDE 360 receives an encrypted CSV text file from Appliance 345 containing the appliance user's consumer data. The communication channel established between SCDE 360 and Appliance 345 can be used by SCDE 360 to first receive the encrypted CSV text file, decrypt the file, parse the file to obtain the anonymous identifier of the user of Appliance 345, determine the aggregate set of anonymous identifiers the user of Appliance 345 is a member of, compare the lead targeting parameters or lead aggregating algorithms used to generate the aggregate set with those provided by Advertiser 305, and, if a match is found, communicate Advertiser 305's offer description and related ad campaign website address to Appliance 345 over the established communication channel. This sequence of actions can be repeated for each appliance user and advertiser served by SCDE 360, such that over a period of time offers from advertisers can be delivered to the appliance users most interested in receiving them. This period of time can be quite short for the software program executing on the network connected appliance of the present invention, to be discussed later, can be configured such that the network connected appliance automatically connects with SCDE 360 multiple times per day to upload encrypted CSV text files containing appliance user consumer data and for other purposes.

Once Advertiser 305's offer description and related ad campaign website address is communicated to Appliance 345, if the offer is of interest, the appliance user may click on the offer description. When the offer is clicked on, Appliance 345 notifies SCDE 360, by use of a communication over Line 317, that the appliance user clicked on the offer description and is awaiting ad campaign website access. The communication includes the appliance user's anonymous Identifier and the ad campaign website address. This is shown in Block 458. In Block 460, SCDE 360 communicates to Advertiser 305 over Line 321 that an appliance user has clicked on Advertiser 305's offer description and is awaiting ad campaign website access. The communication includes the appliance user's anonymous identifier and the ad campaign website address. By comparing the appliance user's anonymous identifier with the anonymous identifiers included in the aggregate of set of identifiers previously communicated to Advertiser 305 by SCDE 360, Advertiser 305 can determine if the appliance user's anonymous identifier is included in the set. If it is, the appliance user is verified as being authentic and Advertiser 305 can grant ad campaign website access to the appliance user. Advertiser 305 grants access by communicating the appliance user's anonymous identifier, and the ad campaign website address, to Publisher 340 over line 385, as indicated in Block 462. Moving to Block 464, SCDE 360, acting as a proxy server, connects Appliance 345 to Advertiser 305's ad campaign website, residing on Publisher 340's servers, through Line 313. Appliance 345 then communicates the appliance user's anonymous identifier to the ad campaign website. Upon receipt of the appliance user's anonymous identifier, Publisher 340 compares the received appliance user anonymous identifier with the anonymous identifier communicated by Advertiser 305 to Publisher 340, and notes the ad campaign website address to which Appliance 345 is seeking access. Should the anonymous identifiers match, and the ad campaign website address, to which Appliance 345 is seeking access, be the same as that communicated to Publisher 340 by Advertiser 305, Publisher 340 grants Appliance 345 access to the ad campaign website.

In the present invention embodiment, Line 313 does not need to be the communication channel over which Appliance 345 communicates with Publishers 340's servers. The system may be configured such that Appliance 345 can access the ad campaign website of Advertiser 305, residing, in this example, on Publisher 340's servers, directly. In this case, no proxy server is employed and instead of using Line 313 for communication with Publisher 340's servers, Line 319 is used. Although this configuration can reliably provide communication between Appliance 345 and Publisher 340's servers, it is not preferred because this alternate communication channel is less private than a communications channel that passes through a proxy server, such as that provided by SCDE 360.

Finally, in Block 466, once Appliance 345 is in communication with Publisher's 340's servers, the appliance user views and interacts with the ad campaign website through SCDE 360 serving as a proxy server. It should be recognized that although there have been numerous references to "Publisher 340's servers", the ad campaign and it content may be hosted on servers that are owned or controlled by other organizations. These organizations include Advertiser 305, Media Agency 310, or cloud services organizations such as Amazon, Google, Apple, Microsoft and Verizon Terremark. Further, there are alternate configurations to the configuration depicted in FIG. 3. In FIG. 3, the ad campaign is created by Media Agency 310 for Advertiser 305 and published by a traditional publisher on their internet Website, Such publishers could include "The San Francisco Chronicle", "The New Yorker Magazine", the "CBS Television Network" or "Better Homes and Gardens". In an alternate configuration, Media Agency 310 develops and creates the Ad Campaign for Advertiser 305, and Advertiser 305 self publishes the campaign on an internet website. In this approach, the ad campaign could be generated by employing content obtained from a variety of content sources, such as newspapers, motion picture studios, television networks, gaming sites, or social networking sites. In addition, Advertiser 305 may create, or commission to have created, their own "advertainment", in which content, perhaps "long form content lasting more that 5 minutes, is created to specifically highlight the advertiser or their products or services. This advertainment could be incorporated in an ad campaign, and self published to the internet by Advertiser 305. When this approach is followed, Publisher 340's servers are replaced with Advertiser's 305 servers. Therefore, referring to FIG. 4, Block 406 is modified to read "Media Agency Creates Ad Campaign Based On Targeted Consumer Attributes From Advertiser, Combines Ad Campaign With Content From Content Sources, And Delivers Ad Campaign To Website Hosting The Ad Campaign; Website Hosting The Ad Campaign Publishes The Ad Campaign To The Internet; And Media Agency Delivers Ad Campaign Website Address To Advertiser", Blocks 408 through 418 are skipped, and the Term "Publisher" is replaced with the term, "Ad Campaign Website Host" in the remainder of the Blocks.

Figure 6:
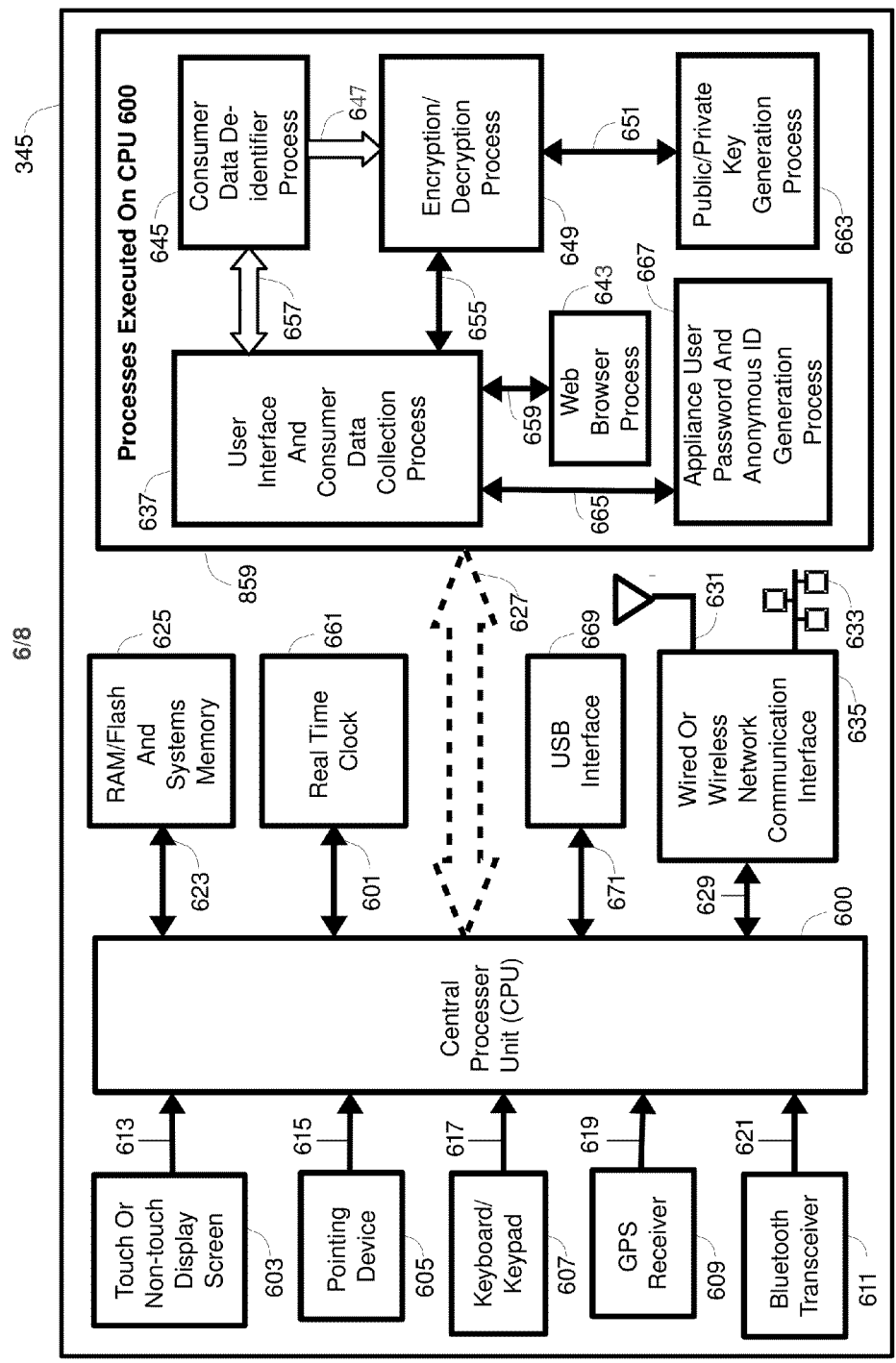
FIG. 6 is a block diagram of a network connected appliance of the present invention.
Figure 7:
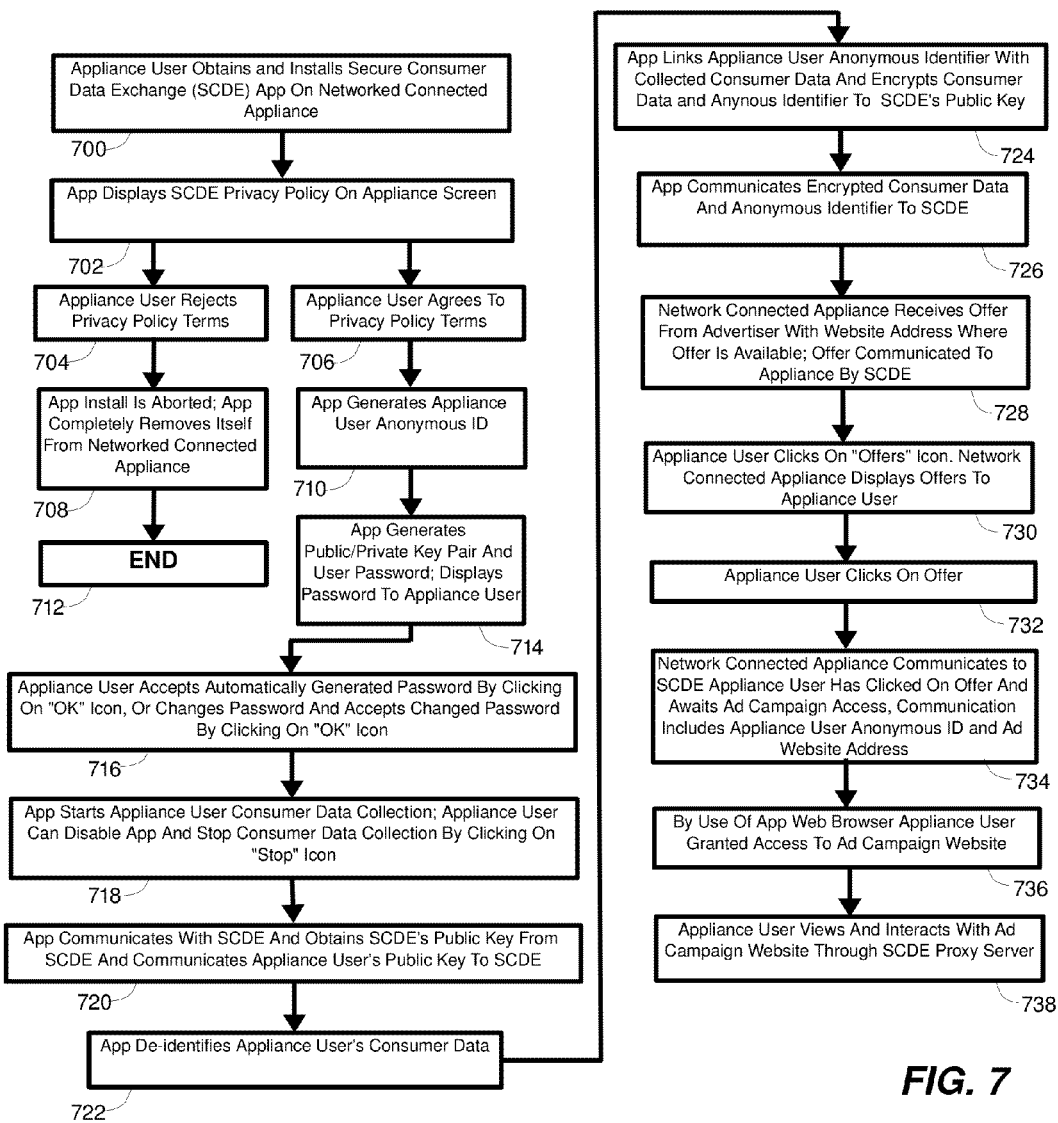
FIG. 7 is a process flowchart of a network connected appliance of the present invention.
Figure 8A:
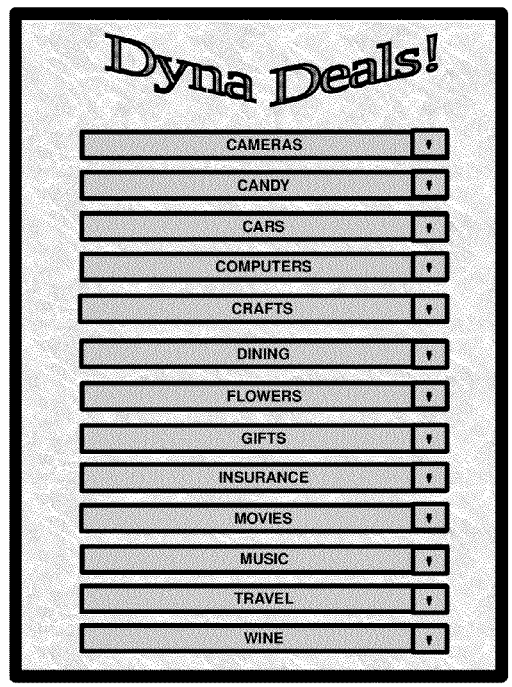
FIGS. 8A and 8B illustrate offer display screens presented to a user of a network connected appliance of the present invention.
Figure 8B:

We now turn to FIGS. 6, 7, 8A and 8B to discuss a network connected appliance of the present invention. FIG. 6 is a block diagram of a network connected appliance of the present invention, such as Appliance 345. Although not indicated in FIG. 6, Appliance 345 could be a desktop personal computer (PC), a laptop PC, a notebook PC, a netbook PC, an Ultrabook PC, a Chromebook PC, a tablet computer, a smartphone, a gaming console, a "Blu-ray" player with Internet connectivity, a smart TV, an internet TV, an IPTV, a set top box, a digital media receiver (Apple TV, Google TV, or Roku streaming media player, for example), or any other network connected appliance capable of sending or receiving data over a network. In the following discussion, FIG. 6 depicts the elements that comprise a tablet computer of the present invention. FIG. 7 is a process flowchart of a network connected appliance of the present invention, and FIGS. 8A and 8B illustrate example offer display screens presented to a user of a network connected appliance of the present invention.

The Appliance 345 actions to be discussed are performed by Central Processor Unit (CPU) 600 of FIG. 6, as controlled by processes executed on CPU 600. Dashed outlined double headed Arrow 627 indicates that Processes 859, which take the physical form of one or more software program applications (apps) stored on RAM/Flash And Systems Memory 625, are executed on CPU 600 to effect such control. In the present invention, as shown in FIG. 7 Block 700, the appliance user first downloads and installs an app from Secure Consumer Data Exchange (SCDE) 360 on to Appliance 345. This app may also be downloaded and installed from app distributors, such as Google Play, the Google app store, iTunes, the Apple app store, or Firefox Marketplace, the Firefox app store. It could also be downloaded and installed from another network connected appliance on which the SCDE app has already been installed. Alternatively, the SCDE app could be installed from removable physical media where the SCDE app code resides, where such removable physical media could be a flash drive, SD drive, or optical media, where the optical media could be Blu-ray, DVD, or Compact Disk (CD). Additionally, the SCDE app could be installed in RAM/Flash And Systems Memory 625 at the time of Appliance 345's manufacture.

The acquisition and installation of the SCDE App is effected by CPU 600 through Wired Or Wireless Network Communication Interface 635, Blue tooth Transceiver 611, or a physical communications interface, such as Universal Serial Bus (USB) Interface 669, through the use of software installed in Systems memory 625 at the time of Appliance 345's manufacture. Initiated by appliance user interaction with Display Screen 603, as controlled by User Interface And Consumer Data Collection Process 637, CPU 600 communicates with SCDE 360, for example, the desire of the appliance user to obtain and install the SCDE app. CPU 600 establishes communications with SCDE 360 over Line 629 through the use of Wired Or Wireless Communication Interface 635. Communications Interface 635 employs Antenna 631 for the wireless network connection or Ethernet Connector 633 for the wired network connection. In either case, one network that can be employed for such communication is the internet. Once the communications channel between Appliance 345 and SCDE 360 has been established, SCDE 360 communicates the SCDE executable app code to Communications Interface 635, which sends the executable app code over Line 629 to CPU 600. CPU 600 then effects storage of the app code in Systems Memory 625, over line 623, from where it can be executed. Such execution may be started automatically by CPU 600 upon completion of app installation, or by the appliance user clicking on the "Start SCDE" icon that appears on Display Screen 603, as controlled by User Interface Process 637.

As shown in Block 702, upon execution, the installed SCDE app first displays SCDE 360s's privacy policy on Display Screen 603. In Block 704, the appliance user can reject SCDE 360's privacy policy terms by clicking on the "Reject" icon appearing on Display screen 603. In the case of a non-touch display, the pressing action may be effected by clicking on the Reject icon by the use of a pointing device, such as a mouse. In the case of a touch screen display, the clicking action may be effected by touching the Reject icon with, for example, a finger or s stylus. Once the Reject button is clicked on, the app install is aborted and the app completely removes itself from Appliance 345, as shown in Block 708. The installation process then ends in Block 712. If in Block 706 the appliance user agrees to SCDE 360's privacy policy terms, by clicking on the "Accept" button appearing on Display Screen 603, CPU 600, as controlled by the SCDE app, first generates an appliance user anonymous identifier in Block 710, using Appliance User Password And Anonymous ID Generation Process 667 in communication with User Interface And Consumer Data Collection Process 637 through Inter-process Communication 665. Following this action, as shown in Block 714, CPU 600, as controlled by the SCDE app, generates an appliance user public/private key pair by use of Public/Private Key Generation Process 663 in communication with Encryption/Decryption Process 649 through Inter-process Communication 651, and also generates an appliance user password by use of Appliance User Password And Anonymous ID Generation Process 667. Then, in communication with User Interface And Consumer Data Collection Process 637, through Inter-process Communication 665, CPU 600 displays the generated user password to the appliance user on Display Screen 603. As shown in Block 716, the appliance user may now accept the password for later use, by clicking on the OK icon that appears on Display Screen 603, or change the password to one that the appliance user is more comfortable with, and accept the changed password by clicking the OK icon. The appliance user's password is used by the SCDE app to assure that the appliance user's collected consumer data is linked with the correct appliance user anonymous identifier. This is necessary because a single network connected appliance may be used by multiple appliance users. The password will also be used to assure that offers communicated to Appliance 345 from Advertiser 305 through SCDE 360, are presented to the appropriate user of Appliance 345.

After the generation of the appliance user's anonymous identifier, public/private key pair, and user password, the SCDE app controls CPU 600 of Appliance 345 to start appliance user consumer data collection, as shown in Block 718.

User Interface And Consumer Data Collection Process 637 controls CPU 600 to effect consumer data collection through the use of Touch Or Non-touch Display Screen 603, Pointing Device 605, Keyboard/Keypad 607, or GPS Receiver 609. Such collected consumer data may include, for example the websites the appliance user visited; what news articles, entertainment content product descriptions and advertisements were clicked on by the appliance user; the search terms used by the appliance user while searching for internet content; what products or services were purchased by the appliance user online; what social networking websites, association websites, and blogs the appliance user visited; how long the appliance user remained connected to each website; the physical location of the appliance user at predetermined time intervals; what "brick and mortar stores" the appliance user visited; as well as personal data. Such personal data may comprise the appliance users name, address and telephone numbers, age, socioeconomic status, place of work, names of friends and acquaintances, number of children, and marital status. In addition, collected consumer data may also include the consumer's network browsing, product purchase, and physical location histories, where such histories include the dates and times at which history events occurred. If the appliance user of Appliance 345 wishes to use the appliance for "private browsing" or wishes to not have their consumer data collected for any reason, the appliance user can disable the SCDE app, and stop consumer data collection, by clicking on the "Stop" icon that is displayed on Touch Or Non-Touch Display Screen 603 by CPU 600, as controlled by User Interface And Consumer Data Collection Process 637, while Appliance 345 is collecting consumer data. This potential appliance user action is also shown in Block 718.

As previously discussed, SCDE 360 receives encrypted consumer data from Appliance 345. In this embodiment of the present invention, the consumer data is encrypted to SCDE 360's public key. It is therefore necessary for Appliance 345 to obtain SCDE 360's public key from SCDE 360, or from any public key server on which it resides, before such encryption is effected. In addition, as will be discussed later, SCDE 360 requires the appliance user's public key in order to securely communicate offers from Advertiser 305 to Appliance 345. Block 720 shows the SCDE app residing in RAM/Flash Systems Memory 625 controlling CPU 600 to use Wired Or Wireless Communication Interface 635 to communicate with SCDE 360, obtain SCDE 360's public key from SCDE 360 and communicate to SCDE 360 the appliance user's public key. In addition, prior to linking the consumer data collected by Appliance 345 with the appliance user's anonymous identifier, encrypting the consumer data and anonymous identifier to SCDE 360's public key, and communicating the encrypted consumer data and appliance user's anonymous identifier to SCDE 360, as shown in Blocks 724 and 726, it is preferable to de-identify the consumer data, as shown in Block 722. This optional step enhances consumer privacy and reduces the chances that the consumer data collected by Appliance 345 will be attributed to a particular individual, should there be a security breach at SCDE 360. Including but not limited to, De-identification removes: the appliance user's name; references to the appliance user's residence location such as street address, city, county, parrish, precinct, or zip code; numbers relating to the appliance user such as the appliance user's date of birth, age, date of admission to a school of higher learning, dates of admission and release from a heath care facility, fax numbers, email addresses, social security numbers, driver license numbers, medical record numbers, health plan beneficiary numbers, financial institution account numbers, credit card numbers, yearly income, total assets, savings accounts balances, society membership numbers, certificate/license numbers, vehicle identifiers and serial numbers, vehicle license plate numbers, device identifiers and serial numbers (such as the universally unique identifier (UUID) embedded in the appliance user's smart phones, tablet computers or personal computers), Internet Protocol (IP) address from which the appliance user communicates over the Internet, or the Media Access Control (MAC) addresses of the network interfaces used by the appliance user; images of the appliance user or the appliance user's friends, family and colleagues; images of the appliance user's residence, neighborhood, house of worship; and the appliance user's ethnicity or religion. Although the embodiment of the present invention being discussed performs de-identification within Appliance 345 prior to the communication of the consumer data to SCDE 360, de-identification could be performed at SCDE 360. Such de-identification could be performed either at the time of SCDE 360's receipt of the consumer data from Appliance 345 or after the consumer data is analyzed and the appliance user's anonymous identifier is aggregated with a set of other appliance user anonymous identifiers whose collected consumer data corresponds to at least one common lead targeting parameter from Advertiser 305, but before it is encrypted and stored in Data Storage 509 for latter use. If the consumer data from Appliance 345 is de-identified after the appliance user's anonymous identifier is aggregated with other appliance user's identifiers, the data would be stored in encrypted form when initially received by SCDE 360.

The consumer data collected by Appliance 345 and communicated to SCDE 360 becomes less representative of the appliance user's, likes, dislikes, desires and needs, as time progresses. Consumer data aging occurs because much of the consumer data collected by Appliance 345 reflects the consumer's current activities, age, socioeconomic level, education level, occupation, peer group pressures, and short term plans. In order to take continuous changes in consumer online behavior into account, and be able to assign the consumers anonymous identifier to the most appropriate aggregate set of anonymous identifiers, the present invention can apply a "rolling storage" approach to the consumer data collected by Appliance 345 and communicated to SCDE 360. In accordance with this approach, SCDE 360 can accumulate the consumer data from Appliance 345 for the period of 6 months immediately after the SCDE app is installed in Appliance 345. Following this initial 6 month period, the first 3 months of collected consumer data from Appliance 345 is purged from Enterprise Server 500's Data Storage Unit 509, while the second 3 months of collected consumer data is retained. During the next 3 month period, the third 3 month period after SCDE app installation in Appliance 345, collected consumer data from Appliance 345 is combined with the previously stored and retained second 3 month period collected consumer data from Appliance 345. This sequence of purging 3 months of consumer data, followed by combining the remaining consumer data with 3 months of newly collected consumer data, continues as long as the SCDE app is installed in Appliance 345. It assures that consumer data analyzed for lead targeting parameters supplied to SCDE 360 by Advertiser 305, reflects the current online behavior of Appliance 345's user. The use of a rolling storage model by SCDE 360 also significantly improves consumer privacy, and thus, in addition to assuring that up to date consumer data is employed by SCDE 360 for data analysis, it facilitates compliance with government consumer privacy legislation and regulations. Such compliance facilitation is realized by the limiting of the amount of encrypted appliance user consumer data resident on Storage Unit 509 of Enterprise Server 500, thus significantly reducing the potential impact of a data compromising SCDE 360 security breach.

If the appliance user of Appliance 345 wishes to de-install the SCDE app, the appliance user can initiate SCDE app de-installation by clicking on the "De-install" icon that is displayed on Touch Or Non-Touch Display Screen 603 by CPU 600, as controlled by User Interface And Consumer Data Collection Process 637. Upon the initiation of the de-installation of the SCDE app from Appliance 345 by the appliance user, Appliance 345 informs SCDE 360 of the apps imminent de-installation by a communication from CPU 600 through Wired Or Wireless Network Communications Interface 635, as controlled by the SCDE app residing in Ram/Flash And Systems Memory 625, just prior to the SCDE app's erasure from Systems Memory 625. Upon receipt of an SCDE app de-installation communication from Appliance 345, High Performance CPU 513 erases all encrypted consumer data files linked to the user of Appliance 345's anonymous identifier and black lists the appliance user's anonymous identifier so no further communication between SCDE 360 and Appliance 345 will take place. The act of removing all consumer data communicated to SCDE 360 from Appliance 345 residing on Storage Unit 509 upon the de-installation of the SCDE app from Appliance 345, further facilitates compliance with government consumer privacy legislation and regulations. Such further compliance is facilitated by assuring that after the user of Appliance 345 de-installs the SCDE app and "opts out" of having their consumer data collected and communicated to other entities, thus rescinding authorization to do so, consumer data previously collected is no longer available to any entity for any purpose.

During some of the communication sessions established by Appliance 345's CPU 600 with SCDE 360, as controlled by the SCDE app residing in Ram/Flash And Systems Memory 625, wherein collected encrypted consumer data and the linked anonymous identifier of the appliance user are communicated to SCDE 360, Appliance 345 receives from SCDE 360 an offer from Advertiser 305. This offer includes the website address (URL) where the offer is available and a description of the offer. These 2 actions are shown in Block 726 and Block 728. Communication between Appliance 345 and SCDE 360 may be initiated at predefined time intervals, such as once per hour, once per day, or a time interval determined to be commensurate with the collection of sufficient consumer data by Appliance 345 to warrant such communication. Communication between Appliance 345 and SCDE 360 may also be initiated when a defined amount of appliance user consumer data is collected. In this latter case, the time interval between communications can vary depending upon how many minutes Appliance 345 is used by the appliance user over a 24 hour time period. In a third approach, appliance user consumer data can be collected and communicated to SCDE 360 when the Appliance user is not using Appliance 345 for data intensive tasks, not using Appliance 345 at all or when network communication traffic is at a minimum. Other bases for time interval selection are possible.

Offers communicated from SCDE 360 to Appliance 345 can be encrypted to the appliance user's public key previously communicated to SCDE 360. Although encrypting such offers is not strictly necessary, it enhances appliance user privacy, so it's use is preferred. Upon receipt of an offer from SCDE 360, the SCDE app residing in RAM/Flash And Systems Memory 625, controls CPU 600, to use Encryption/Decryption Process 649, in conjunction with the appliance user's private key, to decrypt the offer. Once decrypted, the offer is displayed on Touch Or Non-Touch Display Screen 603 by CPU 600, using User Interface And Consumer Data Collection Process 637, as controlled by the SCDE app. Such an offer display can take many forms. FIGS. 8A and 8B depicts 2 possible offer display screen arrangements. FIG. 8A depicts one such arrangement. In the arrangements of FIGS. 8A and 8B, multiple offers from multiple Advertisers, include Advertiser 305, are sorted into categories by CPU 600, as controlled by the SCDE app, before presentation on Touch Or Non-Touch Display Screen 603. The offers are then presented to the appliance user as a multilevel list, wherein the top level of the list is seen by the appliance user as a series of product or services categories. In FIGS. 8A and 8B this list is labeled "Dyna Deals!". Referring to FIG. 8A, it can be seen that the first item in the list is labeled "Cameras". If the appliance user is interested in offers, for example, on the purchase of a still or a movie camera, or repair of a camera, or camera accessories, such as lenses, memory cards or tripods, the appliance user may click on this item of the list. This action will cause the presentation on Display Screen 603 of a list of camera related offers, with offer descriptions, presently available to the appliance user. The descriptions accompanying these offers will include the URL where the offer is available. The descriptions can be incorporated in the presented list as short summaries. If a list item from Advertiser 305 is clicked, Appliance 345 can be connected to the website hosting Advertiser 305's ad campaign and the appliance user can be presented with a detailed promotional presentation that includes full product descriptions, product reviews, related videos, news or entertainment content, social networking opportunities, or long form advertisement, for example. The user interaction related to FIG. 8B is similar to that of FIG. 8A, however in FIG. 8B the traditional list format is replaced with a series of icons. In the case of FIG. 8B, there are 2 camera icons presented. One for still cameras and one for movies cameras. These appear in the last row of icons, $4^{th}$ and $5^{th}$ from the last icon in the row from the right, respectively. If the appliance user clicks on the still camera icon, the screen presentation will be replaced with a series of icons representing offers related to still cameras. Short descriptive text may accompany an icon. Clicking on an icon from Advertiser 305, as in the case of FIG. 8A, can connect Appliance 345 to the website of Advertiser 305's ad campaign, and the appliance user can be presented with a full description of the offer, possibly accompanied with additional promotional material. These actions are shown in Block 730 and Block 732 of FIG. 7.

When the appliance user clicks on an item in the offer list or an offer icon, as shown in Block 732, Network Connected Appliance 345 communicates to SCDE 360 that the appliance user has clicked on an offer from Advertiser 305, and thereby has shown a desire to interact with Advertiser 305. This communication includes the appliance user's anonymous id and the URL of the offer clicked on. Since the offer presented to the user of Appliance 345 has been specially chosen for an appliance user whose consumer data corresponds to a defined lead targeting parameter provided to SCDE 360 from Advertiser 305, it is beneficial to verify the authenticity of the appliance user before access to Advertiser 305's ad campaign and special offer is granted. Authenticity in this case means that the appliance user's anonymous identifier is contained in the aggregate set of anonymous identifiers previously communicated to Advertiser 305. Thus, immediately following the clicking on an offer, the user of Appliance 345 waits for ad campaign access, as shown in Block 734. A description of the appliance user authentication and website granting process appears above in conjunction with Block 460, Block 462 and Block 464 of FIG. 4.

Although the web browsers often incorporated in network connected appliances at the time of manufacture can be employed to communicate with Advertiser 305's ad campaign website, it is preferable, for reasons of consumer privacy, for the SCDE app to include its own web browser. This browser can be designed, for example, such that appliance user tracking objects incorporated into many web pages, such as cookies, local shared objects (LSO) and HTML5 databases, are accepted but not stored, thereby increasing appliance user privacy. Web Browser Process 643 of Network Connected Appliance 345, communicating with User Interface And Consumer Data Collection Process 637, through Inter-process Communication 659, represents such a browser. As shown in Block 736, it is the web browser Appliance 345 employs to access Advertiser 305's ad campaign website, after the appliance user is authenticated and granted access. Once Appliance 345 is granted access, the user of Appliance 345 can view and interact with Advertiser 305's ad campaign website through SCDE 360, serving as a proxy server, or directly, as previously discussed and shown in Block 738.

In accordance with the principles of the present invention, each user who logs into Appliance 345 has a different set of credentials, i.e. password, anonymous identifier, and public/private key pair. Different user credentials are generated by the SCDE app for each appliance user when he or she first uses Appliance 345. Separate credentials allow consumer data collected by Appliance 345 to be correctly attributed to each appliance user, thus providing Advertiser 305, and other advertisers, with the business intelligence needed to direct their ad campaigns and offers to appliance users who would have the most interest. However, if an appliance user uses a plurality of network connected appliances, each of these appliances will generate, under the control of the SCDE app, a different set of credentials for the appliance user. This can lead to a single appliance user being associated with a plurality of anonymous identifiers, and a lower volume of consumer data associated with each one of the anonymous identifiers. Since the greater the volume of consumer data associated with an anonymous identifier, the more accurate the SCDE's analysis of the data can be, it is advantageous to combine appliance user consumer data collected from each network connected appliance used by the appliance user, into a single combined set of consumer data. One way the present invention can effect such combining of consumer data is to cause each network connected appliance employed by the appliance user to incorporate the same appliance user credentials. The synchronization of credentials across multiple appliances employed by the appliance user can be accomplished in a number of ways. A first approach is to physically connect two or more of the user's appliances with an electrical cable, or cables, and, after the appliance user enters his or her passwords for the source and destination appliances, have the appliance user cause the SCDE apps resident on each of the destination user appliances to initiate an encrypted transfer and subsequent installation of credential data, overwriting any credential data previously residing on the destination appliances associated with the appliance user. A second approach can be to use an encrypted wireless communication for the transfer. For example, a Wi-Fi, Bluetooth, Near Field Communication (NFC) or infrared red (IR) optical connection can be employed. Here again the destination user's appliance, or appliances, initiates the encrypted transfer and subsequent installation of credential data. It is important for the destination appliance to initiate transfer and installation of the credential data in order to reduce the potential of such transfer and credential installation being effected by a hacker not associated with the appliance user. Such a wireless transfer can employ Bluetooth Transceiver 611, of Appliance 345, in conjunction with CPU 600, under the control of the SCDE app stored in RAM/Flash And Systems Memory 625.

In the following credential transfer discussion, it is assumed that only a source and a destination user appliance, in this example Destination Appliance 345B and Source Appliance 345A, takes part in the transfer operation. Taking advantage of the appliance user's source and destination appliance public/private keys, destination CPU 600 of Appliance 345B, using destination Bluetooth Transceiver 611, under the control of the destination SCDE app, first communicates to the source CPU 600 of Appliance 345A, under the control of the source SCDE app, the then current public key of the destination appliance. Following this action, CPU 600 of the source appliance, under the control of the source SCDE app, communicates, the public key of the source appliance to the destination appliance. Source CPU 600 then employs source Encryption/Decryption Process 649 to encrypt the source appliance user's credentials to the destination appliance's public key and, over source Inter-process communication 655, in conjunction with source User Interface And Data Collection Process 637, employs source Bluetooth Transceiver 611 to communicate the encrypted source appliance user's credentials to destination Appliance 345B. Destination CPU 600, after receipt of the encrypted source appliance credentials, over destination Bluetooth Transceiver 611, under the control of the destination SCDE app, then decrypts the source appliance user credentials, using destination Encryption/Decryption Process 649 over source Inter-process communication 655, in conjunction with source User Interface And Data Collection Process 637, then overwrites and installs the source appliance's credentials in the destination appliance, in place of the destination appliance's credentials. From this point forward, the appliance user will log into Appliance 345B with the same password as used to log into Appliance 345A, and all consumer data collected and communicated by Appliance 345B to SCDE 360 will be linked to the same anonymous identifier as that which is linked to consumer data collected and communicated to SCDE 360 by Appliance 345A. The appliance user may change his or hers log-in password at any time, on either Appliance 345 A or Appliance 345B, however, the anonymous identifier linked with consumer data collected by either of these appliances will not change. Since SCDE 360 only uses anonymous identifiers linked with received consumer data, and does not employ network connected appliance identifiers, such as UUIDs, or appliance user tracking objects, such as cookies, LSOs and HTML5 databases, to store and combine consumer data received at different times from network connected appliances in which the SCDE app is installed, SCDE 360 will not recognize that such consumer data is provided by different network connected appliances. Therefore, all consumer data communicated to SCDE 360 from a particular network connected appliance user with be appropriately combined and used for the analysis of lead targeting parameters provided by advertisers, such as Advertiser 305. This can result in a more accurate assignment of appliance user anonymous identifiers to aggregate sets of appliance user anonymous identifiers, and thereby lead to a higher advertising campaign return on investment.

Having thus described several aspects of the preferred embodiment of the present invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for providing targeted access to a user of a network connected appliance, comprising:
communicating to a computer processor unit at a first entity consumer data resulting from the user's use of the appliance linked with an appliance user anonymous identifier, wherein processing by the computer processor unit comprises:
analyzing the data by the use of one or more defined parameters;
aggregating in accordance with the results of the analysis the appliance user's anonymous identifier with a set of appliance user anonymous identifiers linked with the consumer data of other appliance users, generating an aggregate set of appliance user anonymous identifiers, wherein each appliance user anonymous identifier included in the aggregate set points to an appliance user whose collected consumer data corresponds to at least one defined parameter in common with the collected consumer data of the other appliance users whose anonymous identifiers are included in the aggregate set;
communicating the aggregate set from the first entity to a second entity; and
providing the second entity with access to the appliance user through the first entity by use of the appliance user's anonymous identifier.

2. The method of claim 1 wherein the consumer data is de-identified prior to communicating the consumer data and appliance user anonymous identifier to the first entity.

3. The method of claim 1 wherein the consumer data is encrypted prior to communicating the consumer data and appliance user anonymous identifier to the first entity.

4. The method of claim 1 wherein at least one defined parameter used to analyze the consumer data is provided by the second entity.

5. The method of claim 1 wherein the first entity communicates to the appliance user a description of an offer available from the second entity.

6. The method of claim 1 wherein the first entity communicates the appliance user's anonymous identifier to the second entity when the appliance user initiates communication with a website where a second entity offering is available.

7. The method of claim 1 wherein the appliance user's anonymous identifier provided to the second entity as a member of the aggregate set of appliance user anonymous identifiers is used to validate the appliance user as a potential buyer of the second entity's offerings.

8. A system for providing targeted access to a user of a network connected appliance, comprising:
a computer at a first entity, the computer being comprised of:
a data storage unit;
a processor unit;
a network communications interface; and
software stored on the data storage unit that control processes executed on the processor unit, wherein:
the processor unit receives consumer data resulting from the user's use of the appliance linked with an appliance user anonymous identifier communicated to the processor unit through use of the network communications interface;
the processor unit analyzes the consumer data by the use of one or more defined parameters;
the processor unit aggregates in accordance with the results of the analysis the appliance user's anonymous identifier with a set of appliance user anonymous identifiers linked with the consumer data of other appliance users, and generates an aggregate set of appliance user anonymous identifiers, the aggregate set of appliance user anonymous identifiers comprised of appliance user anonymous identifiers that point to an appliance user whose collected consumer data corresponds to at least one defined parameter in common with the collected consumer data of the other appliance users whose anonymous identifiers are included in the aggregate set;
the processor unit communicates the aggregate set to a second entity through use of the communication interface; and
the processor unit provides the second entity with access to the appliance user through the first entity by use of the appliance user's anonymous identifier and the communications interface.

9. The system of claim 8 wherein the network connected appliance de-identifies the consumer data prior to communicating the consumer data and appliance user anonymous identifier to the first entity.

10. The system of claim 8 wherein the network connected appliance encrypts the consumer data prior to communicating the consumer data and appliance user anonymous identifier to the first entity.

11. The system of claim 8 wherein the first entity obtains at least one defined parameter used to analyze the consumer data from the second entity.

12. The system of claim 8 wherein the first entity communicates to the appliance user a description of an offer available from the second entity.

13. The system of claim 8 wherein the first entity communicates the appliance user's anonymous identifier to the second entity when the appliance user initiates communication with a website where a second entity offering is available.

14. The system of claim 8 wherein the appliance user's anonymous identifier provided to the second entity as a member of the aggregate set of appliance user anonymous identifiers is used to validate the appliance user as a potential buyer of the second entity's offerings.

15. A network connected appliance for collecting and securely communicating appliance user consumer data resulting from the appliance user's use of the appliance comprising:
a processor;
a memory
a network communications interface; and
a computer program stored in said memory and executed on said processor wherein:
the processor obtains authorization from the appliance user to collect and communicate the appliance user's consumer data to a first and a second entity;
the processor generates an appliance user anonymous identifier;
the processor collects appliance user's consumer data;
the processor links the generated appliance user anonymous identifier with the collected consumer data;
the processor communicates the consumer data and appliance user's anonymous identifier to the first entity by use of the network communications interface; and
the processor receives a communication from the second entity by use of the network communication interface.

16. The appliance of claim 15 wherein the computer program is downloaded from the first entity.

17. The appliance of claim 15 wherein the processor de-identifies the consumer data prior to the network communications interface communicating the consumer data and appliance user's anonymous identifier to the first entity.

18. The appliance of claim 15 wherein the processor encrypts the consumer data prior to the network communications interface communicating the consumer data and appliance user's anonymous identifier to the first entity.

19. The appliance of claim 15 wherein the network communications interface receives a communication from the first entity that includes a communication from the second entity, where said communication from the second entity includes a website address of the second entity.

20. The appliance of claim 19 wherein the network communication interface sends a communication to the first entity indicating that the appliance user is visiting the website address of the second entity.

* * * * *